(12) United States Patent
Royer et al.

(10) Patent No.: US 10,873,070 B2
(45) Date of Patent: Dec. 22, 2020

(54) METHOD AND APPARATUS FOR LIQUEFIED GAS SOLVENT DELIVERY FOR ELECTROCHEMICAL DEVICES

(71) Applicant: SOUTH 8 TECHNOLOGIES, INC., San Diego, CA (US)

(72) Inventors: James Royer, San Diego, CA (US); Cyrus Sam Rustomji, La Jolla, CA (US); Jungwoo Lee, San Diego, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 16/804,207

(22) Filed: Feb. 28, 2020

(65) Prior Publication Data
US 2020/0203703 A1    Jun. 25, 2020

Related U.S. Application Data

(60) Provisional application No. 62/911,505, filed on Oct. 7, 2019.

(51) Int. Cl.
*H01M 2/36* (2006.01)
*H01M 6/16* (2006.01)
(Continued)

(52) U.S. Cl.
CPC ............ *H01M 2/36* (2013.01); *H01M 6/164* (2013.01); *H01M 6/24* (2013.01); *H01M 10/60* (2015.04);
(Continued)

(58) Field of Classification Search
CPC ................. H01M 2/36; H01M 10/60; H01M 2300/0042; H01M 6/164
See application file for complete search history.

(56) References Cited

U.S. PATENT DOCUMENTS 2,310,080 A    2/1943   Hill
3,540,929 A   11/1970   Carlson
(Continued)

FOREIGN PATENT DOCUMENTS

CN    103775822        11/2015
CN    110621965 A  *  12/2019    ........... G01F 15/003
(Continued)

OTHER PUBLICATIONS

International Search Report and Written Opinion for PCT Application No. PCT/US2019/032413, dated Jul. 30, 2019, 13 pages.
(Continued)

*Primary Examiner* — Jonathan G Jelsma
(74) *Attorney, Agent, or Firm* — Manuel de la Cerra

(57) ABSTRACT

Disclosed are novel methods and techniques for introducing liquefied gas solvents into electrochemical devices. Unlike conventional electrolytes, the disclosed electrolytes are based on "liquefied gas solvents" mixed with various salts, referred to as "liquefied gas electrolytes." The disclosed liquefied gas electrolytes can have wide electrochemical potential windows, high conductivity, low temperature capability and/or high-pressure solvent properties. Non-limiting examples of a class of liquefied gases that can be used as solvents for electrolytes include hydrofluorocarbons, and in particular include fluoromethane, difluoromethane, tetrafluoroethane, and pentafluoroethane.

28 Claims, 9 Drawing Sheets

(51) Int. Cl.
*H01M 10/60* (2014.01)
*H01M 6/24* (2006.01)

(52) U.S. Cl.
CPC .............. *H01M 2300/0042* (2013.01); *H01M 2300/0091* (2013.01)

(56) References Cited

U.S. PATENT DOCUMENTS

| | | | |
|---|---|---|---|
| 4,460,666 | A | 7/1984 | Dinkler |
| 5,011,751 | A | 4/1991 | Yoneyama |
| 5,213,908 | A | 5/1993 | Hagedorn |
| 5,702,845 | A | 12/1997 | Kawakami et al. |
| 5,753,389 | A | 5/1998 | Gan et al. |
| 5,770,033 | A | 6/1998 | Murphy et al. |
| 7,621,302 | B2 | 11/2009 | Shock |
| 2001/0049051 | A1 | 12/2001 | Jones |
| 2004/0131934 | A1 | 7/2004 | Sugnaux |
| 2004/0258989 | A1 | 12/2004 | Lee |
| 2005/0016840 | A1 | 1/2005 | Petillo |
| 2007/0099089 | A1 | 5/2007 | Miura |
| 2009/0084194 | A1* | 4/2009 | Shock .................. G01F 13/006 73/861.356 |
| 2011/0003207 | A1 | 1/2011 | Oh |
| 2011/0236766 | A1 | 9/2011 | Kolosnitsyn |
| 2012/0107650 | A1 | 5/2012 | Kritzer |
| 2012/0189937 | A1 | 7/2012 | Dophle et al. |
| 2015/0072248 | A1 | 3/2015 | Watanabe |
| 2016/0261005 | A1 | 9/2016 | Rustomji et al. |
| 2017/0346134 | A1 | 11/2017 | Bandhauer |
| 2018/0375156 | A1 | 12/2018 | Zhamu et al. |

FOREIGN PATENT DOCUMENTS

| | | | |
|---|---|---|---|
| EP | 2144325 | A1 | 1/2010 |
| JP | H1040958 | A | 2/1998 |
| JP | 4950754 | | 6/2012 |
| JP | 2015041526 | A | 3/2015 |
| JP | 2016152231 | A | 8/2016 |
| WO | 2015074006 | A1 | 5/2015 |
| WO | 2017204984 | A | 11/2017 |
| WO | 2018/185403 | | 10/2018 |

OTHER PUBLICATIONS

International Search Report and Written Opinion for PCT Application No. PCT/US2019/032414, dated Aug. 2, 2019, 16 pages.
International Search Report and Written Opinion for PCT Application No. PCT/US2017/029821, dated Sep. 7, 2017, 10 pages.
Abbott, et al., "Electrochemical investigations in liquid and supercritical 1,1,1,2-tetrafluoroethane (H FC 134a) and difluoromethane (HFC 32)," J. ElectroanaL Chern., vol. 457, 1998, pp. 1-4.
Bard, A., "New challenges in electrochemistry and electroanalysis," Pure & AppL Chem., vol. 64, 1992, pp. 185-192.
Bruno, et al., "Electrochemical Oxidation of C602+ and C603+", J. Am. Chem. Soc., vol. 125,2003, pp. 15738-15739.
Garcia, et al., "Electrochemistry in Liquid S02," J. Electrochem. Soc., vol. 137, 1990, pp. 2752-2759.
Iwama, et al., "Characterization of commercial supercapacitors for low temperature applications," J. Power Sources, vol. 219, 2012, p. 235-239.
Ke, et al., Electrodeposition of germanium from supercritical fluids: Phys. Chern. Chem. Phys., vol. 14,2012, pp. 1517-1528.
Simon, et al., "Materials for electrochemcial capacitors," Nature Materials, vol. 7,2008, pp. 845-854.
Extended European Search Report for European Patent Application No. 14861242.7; dated Mar. 1, 2017.
Amatucci et al., "Fluoride based electrode materials for advanced energy storage devices," Journal of Fluorine Chemistry, 128, 243-262 (2007).
Liu et al., "Hllow Nanostructured Anode Materials for Li-Ion Batteries," Nanoscale Res Lett, 5:1525-1534 (2010) Abstract, p. 1525, col. 1-2.
Mukerjee, "Particle size and structural effects in platinum electrocatalysis," Journal of Applied Electrochemistry, 20, 537-548 (1990) p. 537, para 2.
Abbott, A. et al., "Conductivity of (C4H9)4N BF4 in Liquid and Supercritical Hydrofluorocarbons", J. Phys. Chern. B 2000, vol. 104, pp. 9351-9355.
Linden, D. et al., "The Lithium-Sulfur Dioxide Primary Battery—Its Characteristics, Performance and Applications", Journal of Power Sources, 1980, vol. 5, pp. 35-55.
West, w.e. et al., "Sulfuryl and Thionyl Halide-Based Ultralow Temperature Primary Batteries", Journal of the Electrochemical Society, 2010, vol. 157, pp. A571-A577.
International Search Report and Written Opinion for PCT Application No. PCT/US2014/66015, dated Apr. 13, 2015 , 15 pages.
International Search Report for PCT/US2020/020547 dated Jun. 5, 2020.

\* cited by examiner

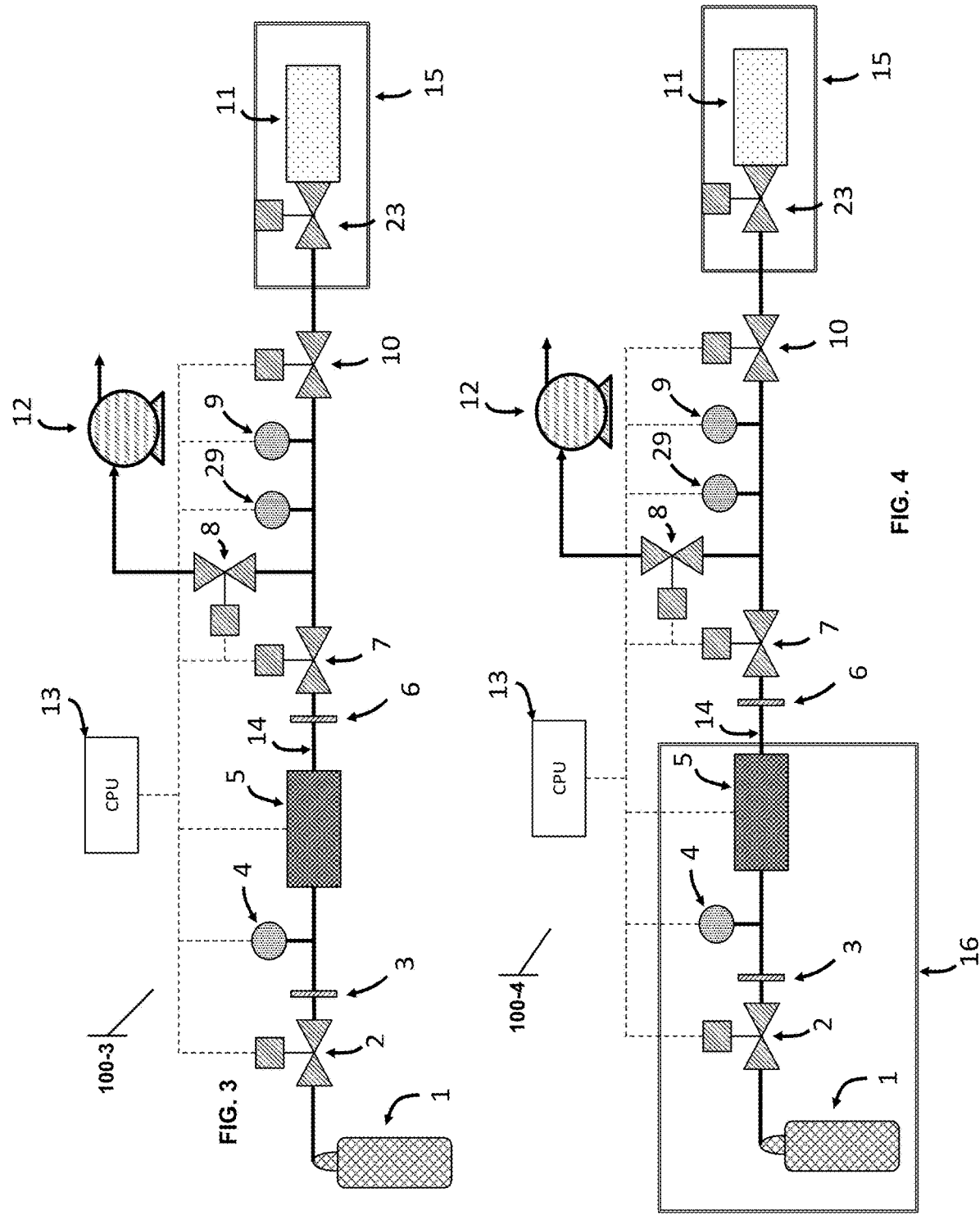

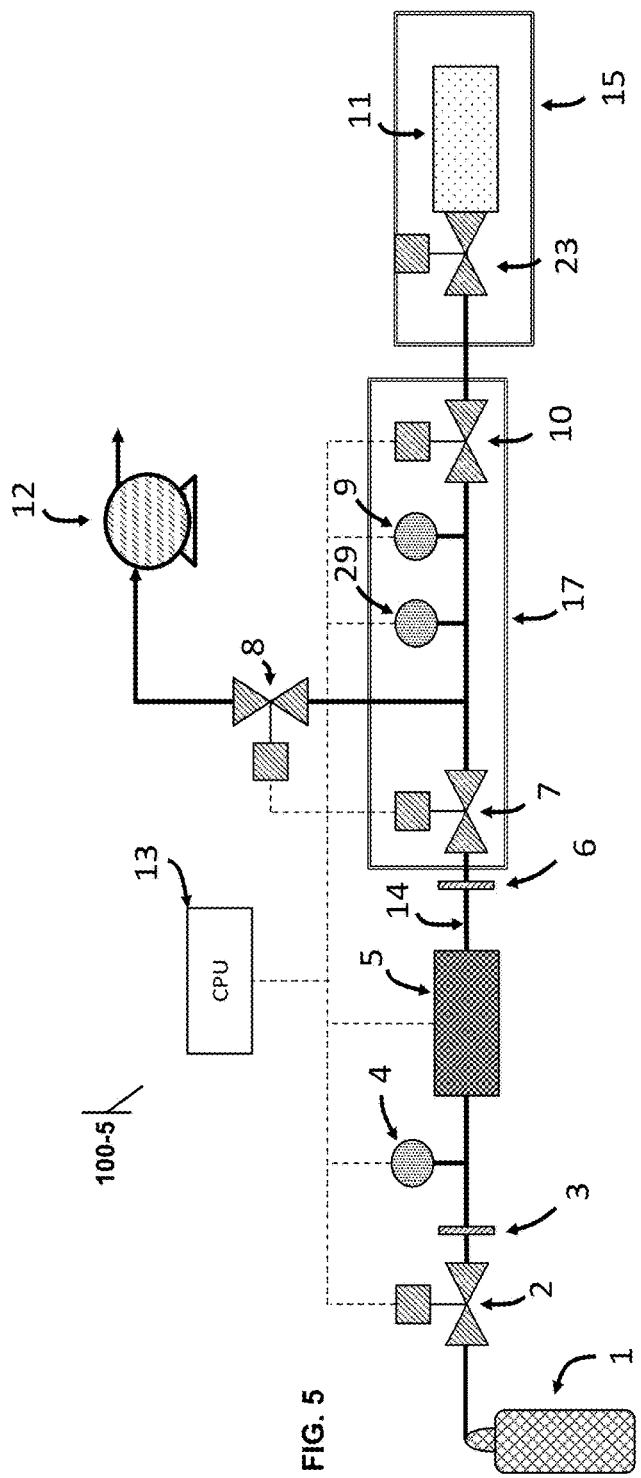
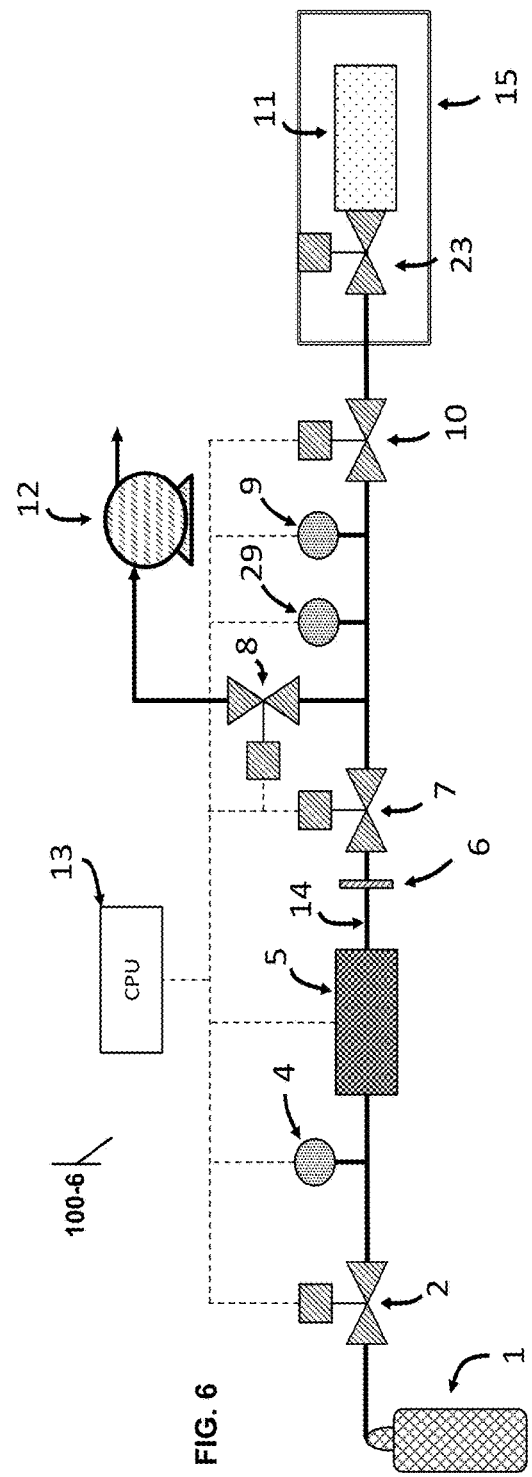

METHOD AND APPARATUS FOR LIQUEFIED GAS SOLVENT DELIVERY FOR ELECTROCHEMICAL DEVICES

PRIORITY CLAIM AND RELATED PATENT APPLICATION

This patent claims priority as a non-provisional of U.S. Patent Application No. 62/911,505, filed on Oct. 7, 2019 and entitled "METHOD AND APPARATUS FOR LIQUEFIED GAS SOLVENT DELIVERY FOR ELECTROCHEMICAL DEVICES," the entire contents of which are incorporated by reference in this document.

This patent is related to U.S. patent application Ser. No. 15/036,763, filed on May 13, 2016; International Application No PCT/US2014/066015, filed on Nov. 17, 2014; U.S. Patent Application No. 61/905,057, filed on Nov. 15, 2013; U.S. Patent Application No. 61/972,101, filed on Mar. 28, 2014; International Application No. PCT/US2019/032413, filed on May 15, 2019; U.S. Provisional Application No. 62/673,792, filed on May 18, 2018; U.S. application Ser. No. 15/036,763, filed on May 13, 2016; PCT/US17/29821, filed on Apr. 27, 2017; U.S. application Ser. No. 16/305,034, filed on Nov. 28, 2018; PCT/US2019/032414, filed on May 15, 2019; U.S. Provisional Application No. 62/673,752, filed on May 18, 2018; U.S. Provisional Application No. 62/749,046, filed on Oct. 22, 2018; U.S. Provisional Application No. 61/972,101, filed on Mar. 28, 2014; U.S. Provisional Application No. 61/905,057, filed on Nov. 15, 2013; and U.S. application Ser. No. 16/793,190, filed on Feb. 18, 2020. The entire contents of each of these documents are incorporated by reference in this document.

STATEMENT REGARDING FEDERALLY SPONSORED RESEARCH OR DEVELOPMENT

This invention was made with United States government support by the National Science Foundation, grant number 1831087.

TECHNICAL FIELD

This patent document relates to a gas fill method and apparatus for the accurate mass delivery of liquefied gas solvent for the preparation of electrochemical energy storage devices.

BACKGROUND

The energy density of batteries is proportional to the operating voltage. In supercapacitors (i.e., electrochemical double-layer capacitors), the energy density is proportional to the voltage squared. With a greater demand for increased energy densities in electrochemical energy storage devices, significant improvements can be made by increasing the voltage ratings of such devices. An important contributing factor to the voltage limitation of electrochemical energy storage devices is the stability of the electrolyte solvent. At increased voltages, the electrolyte solvent may break down and increase in resistance. As a result, loss of charge storage capability (capacity), gassing and device end of life may be reached. Therefore, improving the voltage rating of such devices is highly dependent on the electrolyte system used. Increasing the oxidation resistance of solvents may widen the potential window of the electrolyte, defined as the potential difference between which significant oxidation and reduction current occurs, and can be very useful in electrochemical applications such as batteries, supercapacitors, chemical sensing and common reduction-oxidation electrochemistry.

Conventional electrochemical energy storage devices, such as batteries or capacitors, use electrolyte solutions composed of solvents that are in liquid phase at normal operating temperature and pressure. Recently published prior art has disclosed electrochemical devices utilizing electrolytes with liquefied gas solvents. The introduction of liquefied gas solvents into electrochemical devices may require a different filling process for the electrolyte solution. Conventional electrochemical devices utilizing liquid solvents may use any suitable liquid phase transfer mechanism to fill the device, such as the addition of a known volume of electrolyte solution through a pipette. These standard practices are not possible with liquefied gas solvents due to their high vapor pressure, which prevents transfer in the liquid phase at normal temperature and pressure. The prior art discloses a fill process utilizing a mass flow controller or mass flow meter to control the gas flow into the electrochemical device. The prior art also discloses cooling of the electrochemical device to condense the gas into the device.

Gas phase delivery systems requiring accurate flow rate control may utilize mass flow controller (MFC) or mass flow meter (MFM) instruments. Mass flow controllers may be subject to process constraints such as operating pressure, operating temperature, and flow rate dynamic range. Mass flow controllers may also be sensitive to sudden changes in flow and pressure, causing transient deviations from flow set point conditions. These limitations in operation window and stability may be in part due to the control valve attached to the unit. These process constraints make certain MFC instruments undesirable for use in the electrochemical device filling process. Commercial mass flow meter instruments may have wider process windows with respect to MFCs because the MFM may not have an attached control valve. Therefore, a MFM may be more suitable for use in the electrochemical device filling process. The MFM may be coupled with flow and pressure controls that are compatible with the liquefied gas fill process parameters to enable accurate flow monitoring.

A typical pressure control device may be a mechanical gas regulator. Conventional mechanical gas regulators may not be ideal for delivery of gas when the operating pressure is near the source vapor pressure. The regulator output can become unstable during flow when the outlet pressure is close to the inlet pressure. Additionally, mechanical regulators may be sensitive to downstream flow spikes or droop, which can cause flow measurement inaccuracies.

Conventional flow controllers, either manual or electronic, may not be suited for liquefied gas based electrochemical device fill processes due to the limitations in accuracy or operation windows, as discussed above. These limitations in accuracy may also impact the performance of electrochemical devices fabricated using liquefied gas solvents. The prior art has demonstrated that the performance of electrochemical devices is greatly affected by the volume of the electrolyte. Deviations in the concentrations of electrolyte components can negatively impact the performance of electrochemical devices. For instance, too little electrolyte may not allow full utilization of all the electrode capacity within the device. Furthermore, too much electrolyte lowers the energy density of the electrochemical device through an increase in mass. It is necessary to prepare an electrochemical device with an accurate electrolyte mass in order to match specified energy densities. Therefore, there is a need for an apparatus and method for the accurate delivery of liquefied gas solvents to electrochemical devices.

SUMMARY

Disclosed are novel electrolytes, and techniques for making devices using such electrolytes, which are based on liquefied gas solvents. Unlike conventional electrolytes, disclosed electrolytes are based on "liquefied gas solvents" mixed with various salts, referred to as "liquefied gas electrolytes." Various embodiments of a liquefied gas solvent include a material that is in a gas phase and has a vapor pressure above atmospheric pressure at room temperature. Electrochemical devices, such as rechargeable batteries and supercapacitors, which use such liquefied gas electrolytes, are also disclosed. Also disclosed are techniques for electroplating difficult-to-deposit metals or alloys using liquefied gas electrolytes as an electroplating bath. The disclosed liquefied gas electrolytes can have wide electrochemical potential windows, high conductivity, low or high temperature operation capability, high oxidation resistance, and beneficial high pressure solvent or solid electrolyte interfaces (SEI) forming properties.

Conventional electrolytes use solvents that are in liquid phase under normal atmospheric conditions, which is defined as a pressure of 100 kPa, or one atmosphere, and a temperature of 293.15 K, or room temperature. In contrast, disclosed liquefied gas electrolytes use a "liquefied gas solvent" that has a vapor pressure above atmospheric pressure of 100 kPa at room temperature of 293.15 K. Hence, without a properly pressurized environment, such a liquefied gas solvent is often in gas phase, which is not suitable for forming electrolytes.

Methods and structures are disclosed to accurately fill an electrochemical device or cell with a liquefied gas solvent that has a vapor pressure above an atmospheric pressure of 100 kPa at a room temperature of 293.15 K. The method includes providing a fill setup that has a liquefied gas solvent source connected to a flow meter, which in turn is connected to the electrochemical device. A valve structure is included that allows the liquefied gas solvent to flow from the liquefied gas solvent source to the electrochemical device. The connection between the flow meter and the electrochemical device includes a waste volume, a pressure sensor that detects the pressure of the waste volume, and a temperature sensor that detects the temperature of the waste volume. The method includes the following steps: (a) setting a preset amount of the liquefied gas solvent to be delivered to the electrochemical device; (b) actuating the valve structure to allow the flow of the liquefied gas solvent to the electrochemical device; (c) determining the amount of the liquefied gas solvent in the waste volume based on the pressure and temperature sensors; (d) determining the amount of the liquefied gas solvent supplied to the flow meter; and (e) actuating the valve structure to stop the flow of the liquefied gas solvent to the electrochemical device based on the preset amount, the amount determined to be in the waste volume and the amount determined to have been supplied to the flow meter.

The method may include using a reading from the mass flow meter in step (d). The setup may include a mass flow controller, and the method may further include setting the mass flow controller to a preset flow rate, and determining the amount of time the liquefied gas solvent has flowed through the mass flow controller, which would be the basis to determine how much liquefied gas solvent was supplied to the flow meter.

The actuation of the valve structure may be based on a comparison of the amount of liquefied gas solvent determined to have been supplied to the flow meter to the sum of the preset amount and to the amount determined to be in the waste volume.

The fill setup may also include a temperature control element constructed to maintain a variance of temperature within the waste volume to within +/−2.0 degrees Celsius. Similarly, the setup may include a temperature control element constructed to maintain the connection between the liquefied gas solvent source and the flow meter to within +/−2.0 degrees Celsius. The fill setup may also have a pressure regulator or pressure controller constructed to maintain the variance of the connection between the pressurized source and the flow meter to within +/−25 kPA.

The method may be expanded to include a second liquefied gas solvent source. Specifically, the fill setup would further include a second liquefied gas solvent source connected to a flow meter and a second valve structure constructed to allow the liquefied gas solvent to flow from the second liquefied gas solvent source to the electrochemical device. The method would then further include the following steps: (a2) setting a second preset amount of the liquefied gas solvent from the second liquefied gas solvent source to be delivered to the electrochemical device; (b2) actuating the second valve structure to allow the flow of the second liquefied gas solvent to the electrochemical device; (c2) determining the amount of the second liquefied gas solvent in the waste volume based on the pressure and temperature sensors; (d2) determining the amount of the second liquefied gas solvent supplied to the flow meter based on the flow meter; and (e2) actuating the second valve structure to stop the flow of the second liquefied gas solvent to the electrochemical device based on the second preset amount, the amount of the second liquefied gas solvent determined to be in the waste volume, and the amount of the second liquefied gas solvent determined to have been supplied to the flow meter. Steps (b2) -(e2) are performed after step (e).

The connection between the flow meter and the electrochemical device may further include a third valve structure and a pump between the third valve structure and the flow meter. The method could then include the following step: prior to performing steps (b2) -(e2), the third valve structure is closed, and the pump is actuated to evacuate the waste volume of the liquefied gas solvent.

The method can be used with liquefied gas solvents selected from the group consisting of: fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, molecular oxygen, molecular nitrogen, carbon monoxide, carbon dioxide, sulfur dioxide, dimethyl ether, nitrous oxide, nitrogen dioxide, nitrogen oxide, carbon disulfide, hydrogen fluoride, hydrogen chloride, combination thereof, and isomers thereof.

Also disclosed is a fill setup with the flow meter, valve structures, pressure sensor, temperature sensor and pump connected to and controlled by a controller performing the steps just described.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

FIG. 3 is a block diagram showing an embodiment of the apparatus for liquefied gas solvent delivery to electrochemical devices, where the electrochemical device is connected to a heat sink.

FIG. 4 is a block diagram showing an embodiment of the apparatus for liquefied gas solvent delivery to electrochemical devices, where the liquefied gas source and/or gas delivery line are temperature controlled.

FIG. 5 is a block diagram showing an embodiment of the apparatus for liquefied gas solvent delivery to electrochemical devices, where the gas line between the orifice and electrochemical device is temperature controlled.

FIG. 6 is a block diagram showing an embodiment of the apparatus for liquefied gas solvent delivery to electrochemical devices, where there is no upstream orifice.

DETAILED DESCRIPTION

Figure 1:
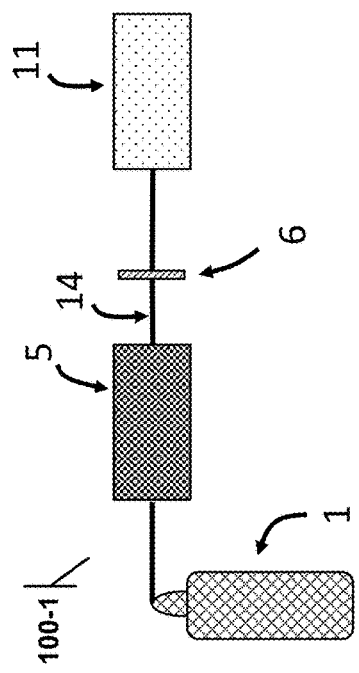
FIG. 1 is a block diagram showing an embodiment of the apparatus for liquefied gas solvent delivery to electrochemical devices.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order to not unnecessarily obscure the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

| Fill setup | 100-1, 100-2, 100-3, 100-4, 100-5, 100-6, 100-7, 100-8, 100-9, 100-10 |
|---|---|
| Liquefied gas solvent source | 1 |
| Valve | 2 |
| Orifice | 3 |
| Pressure Monitor/Sensor | 4 |
| Mass Flow Meter | 5 |
| Orifice | 6 |
| Valve | 7 |
| Valve | 8 |
| Pressure Monitor/Sensor | 9 |
| Valve | 10 |
| Electro-chemical device | 11 |
| Pump | 12 |
| Processor | 13 |
| Metal, plastic, or ceramic tubing | 14 |
| Heat sink/cooler | 15 |
| Temperature control element/Heater | 16 |
| Temperature control element/Heater | 17 |
| Pressure controller | 18 |
| Mass flow controller | 19 |
| Liquefied gas source | 20 |

| | |
|---|---|
| Gas delivery line | 21 |
| Gas delivery line | 22 |
| Valve | 23 |
| Temperature control element/Heater | 24 |
| Temperature control element/Heater | 25 |
| Waste volume | 26 |
| Valve | 27 |
| Valve | 28 |
| Temperature Sensor | 29 |

Method of filling an electrochemical device with a liquefied gas solvent that has a vapor pressure above an atmospheric pressure of 100 kPa at a room temperature of 293.15 K

200

Steps of Method 205-255

Introduction

It is generally agreed that a limiting factor to further extending electrochemical capabilities of electrochemical energy storage devices, such as rechargeable Lithium (Li)-ion batteries (LIB) and electrochemical double layer capacitors (EDLC), is the electrolyte, and intense efforts are being made to improve these systems by expanding the potential window and conductivity over a wide temperature range. Properties that make up a good solvent for electrolytes (e.g., solvent viscosity, permittivity, reduction and oxidation potentials, conductivity, etc.) are well-known and studied for numerous solvents. However, potential windows, defined as the potential difference between which significant oxidation and reduction current occurs, are typically limited to less than ~4.5 V for the existing electrolyte-based systems. Ionic liquid-based electrolytes offer a promising approach to electrochemical systems, but are still difficult to handle and to manufacture, and often do not perform as well as traditional organic electrolytes. High energy density cathodes that have been developed for next generation Li-ion batteries have yet to be implemented because of the lack of a suitable electrolyte system. Electrochemical double layer capacitors are similarly limited in their energy density due to the limited potential window of the electrolytes.

The vast majority of research efforts on new electrolytes targets systems using chemicals that are liquid at room temperature and at normal atmospheric pressure, herein referred to as "liquid solvents." While convenient to work with, these liquid solvents may not offer the best properties. The use of low molecular weight liquefied gas solvents based on hydrofluorocarbon solvents molecules can be promising candidate solvents in next generation electrolytes. These solvents generally exhibit high oxidation resistance, due to the highly electronegative fluorine groups of these hydrofluorocarbon molecules. Optimization of the conductivity of these liquefied gas solvent systems, which would enable utilization of these electrolytes in batteries and electrochemical double layer capacitors, has not been done. According to some embodiments of this patent disclosure, new data obtained has shown that these electrolyte systems can actually be made highly conductive over a surprisingly broad range of temperatures and can enable the use of these novel solvents in next-generation, significantly higher-capacity energy storage devices.

Large capacity energy storage devices, such as Li-ion batteries or supercapacitors, are important devices essential for modern engineering and communications devices as well as consumer markets. These devices are described below.

Supercapacitors (or electrochemical capacitors) are made up of two electrodes physically separated by an ion-permeable membrane (often called a separator), immersed in an electrolyte that electrically connects the two electrodes (i.e., cathode and anode). When a voltage is applied and the electrodes are polarized, ions in the electrolyte form electric double layers of opposite polarity to the electrode's polarity. Thus, a positively polarized electrode will have a layer of negative ions forming at the interface between electrode and electrolyte. For charge-balancing, a layer of positive ions adsorb onto the negative layer. For the negatively polarized electrode, the opposite situation is developed.

Typically, the energy density of batteries increases with the operating voltage, and the energy stored electrochemically inside the electrode. In supercapacitors (also referred to as "electrochemical double-layer capacitors" or sometimes as "ultracapacitors"), the energy density is proportional to capacitance times voltage squared, i.e., $E=(½)CV^2$, and energy is stored in the electrostatic attraction between opposite charges in the electrode and in the electrolyte. Therefore, a higher operating voltage is important for achieving higher power in energy storage devices such as supercapacitors and batteries. With a greater demand for increased energy densities in electrochemical energy storage devices, significant improvements can be made by increasing the voltage ratings of such devices.

Based on electrode design, three types of supercapacitors are often used. (1) Electrochemical double-layer capacitors (EDLC) typically use carbon electrodes or related materials. EDLCs exhibit much higher electrostatic double-layer capacitance than electrochemical pseudocapacitance. (2) Electrochemical pseudocapacitors typically use metal oxide or conducting polymer electrodes. (3) Hybrid capacitors have asymmetric electrodes; for example, one electrode exhibits mostly electrostatic capacitance, while the other electrode shows mostly electrochemical capacitance.

Supercapacitors have energy densities that are approximately one-tenth of the energy densities of conventional batteries, but with fast charge/discharge cycles, their power density can be 10 to 100 times greater that of the batteries. Such a higher power density can be useful, for example, for starting automobile engines. Acetonitrile based electrolytes are advanced electrolytes for EDLC supercapacitors, but they are often flammable and can release cyanide gas upon ignition. Consequently, acetonitrile based electrolytes are not preferred for general automotive applications. Propylene carbonate is considered a good all-round solvent, but has a limitation of minimum operating temperature of −25° C. Other electrolytes being developed use ionic liquids. Such electrolytes are very expensive to manufacture, and their low temperature performance tends to be very poor.

The energy density of both Li-ion batteries and supercapacitors is strongly dependent on operating voltage. Additionally, there are some other important aspects that require innovative new concepts to overcome the current barriers. The disclosed liquefied gas solvent-based electrolytes provide solutions to overcome these barriers, which are described below.

(1) A major contributing factor to the voltage limitation of electrochemical energy storage devices is the stability of the electrolyte's solvent. At high oxidizing or reducing voltages, the solvent may break down and increase resistance, and, as a result, a loss of charge storage capability (capacity), gassing and device end of life may be reached. Hence, improving the stability of such devices is highly dependent on the electrolyte system used, and the disclosed liquefied gas solvent-based electrolyte system enables a higher voltage operation of the electrochemical energy storage devices.

(2) The ionic conductivity of electrolytes is often lowered by highly viscous solvents or with relatively high melting point solvents. Hence, identifying a solvent, or a mixture of solvents having a low viscosity and a low melting point is important to improve the ionic conductivity of electrolyte systems. The disclosed liquefied gas solvent-based electrolyte system offers improved ionic conductivity.

(3) The solid-electrolyte-interface (SEI) is known to be an important component in common electrochemical energy storage devices, of which the solvent in the electrolyte plays an important role. The SEI is a complex, yet very thin layer (e.g., 10-100 nm in thickness) that forms on the electrode surface from the decomposition products from the battery's electrolyte, often due to side reactions caused mainly by the reduction or oxidation of solvents at the surface. SEI is very sensitive to water and oxygen, and battery degradation with time and charge/discharge cycles is often attributed to the properties of the SEI layer. Identifying solvents that play a beneficial role in the SEI layer formation, and producing SEI layers that are less detrimental to the battery operational cycles and long term battery stability are desired. The disclosed liquefied gas solvent-based electrolyte system offers a possibility of more stable SEI layer formation.

(4) Many electrochemical device applications, such as supercapacitors, require a high surface area electrode with nanopores that are often inaccessible to the electrolyte due to high surface tension, trapped gas or gas generated within the electrode. An electrolyte with improved accessibility to these nanopores is beneficial to the overall system performance. The disclosed liquefied gas solvent-based electrolyte system offers an easier penetration of electrolytes into nanoporous surfaces by virtue of the higher pressure employed in the liquefied gas solvent-based devices.

(5) Electrodeposition of difficult-to-electroplate metals and alloys such as Ti, Al, Si, and W can be enabled with larger potential windows in electrochemical systems, and therefore it is desirable to find a solvent and electrolyte compositions that can enable electroplating of such metals for a myriad of industrial applications, which also include improved redox electrochemistry and chemical sensing. Enabling of electrodeposition of semiconductors such as Si can offer significant manufacturing and economic advantages for the electronics industry. Enabling of electrodeposition of aluminum, titanium, tungsten and their alloys can have significant industrial and economic impact toward easier and inexpensive surface passivation (e.g., via anodization coating formation for protective or decorative surfaces), corrosion resistance, wear resistance, and environmental cleaning (e.g., in the case of utilizing the advantageous effect of titanium or titanium oxide surface coating for enhanced decomposition of toxic materials or for water purification). The disclosed technology enables electroplating or sensing with higher electrochemical potential windows.

The disclosed technology can increase the potential window of the electrolyte, improve ionic conductivity over a wide temperature range, improve the SEI layers, and improve electrolyte accessibility to nanopores, all of which can be very useful in electrochemical applications such as batteries, supercapacitors, electroplating, chemical sensing and common reduction-oxidation electrochemistry.

Overview

Disclosed are novel and advantageous electrolytes, techniques for making, and structures and devices using such electrolytes, which are based on liquefied gas solvents in combination with metal-ion containing salt and/or non-metal-ion containing salt.

In the examples in this document, a liquefied gas solvent-based electrolyte or "liquefied gas electrolyte" is a mixture electrolyte that includes a liquefied gas solvent portion and a salt portion, which are mixed together under a pressurized condition to form the liquefied gas electrolyte. The composition and manufacture of the gas electrolyte is disclosed in the applications listed above and incorporated by reference.

The liquefied gas solvent may include fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, molecular oxygen, molecular nitrogen, carbon monoxide, carbon dioxide, sulfur dioxide, dimethyl ether, nitrous oxide, nitrogen dioxide, nitrogen oxide, carbon disulfide, hydrogen fluoride, hydrogen chloride, combination thereof, and isomers thereof.

Accurate and efficient introduction of the gas electrolyte into the electrochemical energy storage devices is critical. Conventional flow controllers, either manual or electronic, may not be suited for liquefied gas based electrochemical device fill processes due to the limitations in accuracy or to the operation windows, as discussed above. These limitations in accuracy may also impact the performance of electrochemical devices fabricated using liquefied gas solvents. The prior art has demonstrated that the performance of electrochemical devices is greatly affected by the volume of the electrolyte. Deviations in the concentrations of electrolyte components can negatively impact the performance of electrochemical devices. For instance, too little electrolyte may not allow full utilization of all the electrode capacity within the device. Furthermore, too much electrolyte lowers the energy density of the electrochemical device through an increase in mass.

The proposed and novel method uses a liquefied gas source, a mass flow meter, and an orifice to the flow vapor of the liquefied gas into an electrochemical device. A steady gas flow rate through the orifice is obtained by having choked flow conditions while filling the electrochemical device. Choked flow occurs when the downstream pressure of the orifice is less than approximately one half the upstream pressure. With these pressure conditions satisfied, the flow rate through the orifice is fixed by the sonic velocity of the gas. The flow rate is insensitive to pressure fluctuations downstream of the orifice, provided that choked flow conditions remain. The choked flow rate is dependent upon the pressure upstream of the orifice, the molecular weight of the gas, the gas temperature, and the orifice diameter. The flow can be approximated by Equation 1.

$$\text{Flow} = \text{constant} * \frac{P1}{29.7} * \sqrt{\frac{29}{M}} * \sqrt{\frac{528}{T}} * d^2 \qquad \text{Equation 1}$$

In Equation 1, P1 is the pressure upstream of the orifice in pounds per square inch, M is the molecular weight of the gas, T is the temperature of the gas in degrees Rankine, and d is the orifice diameter in micrometers. Table 1 shows the respective flow rates for fluoromethane in standard cubic centimeters per minute at different upstream pressures and orifice diameters based on the calculations from Equation 1.

TABLE 1

| Upstream Pressure (psia) | 10 μm orifice diameter | 50 μm orifice diameter | 100 μm orifice diameter |
| --- | --- | --- | --- |
| 50  | 3  | 68  | 271 |
| 100 | 5  | 136 | 543 |
| 150 | 8  | 203 | 814 |
| 200 | 11 | 271 | 1085 |
| 250 | 14 | 339 | 1357 |
| 300 | 16 | 407 | 1628 |

An additional "constant" parameter may be included in Equation 1 in conditions where choked flow is not satisfied. Under such conditions, the flow is dependent on the pressure downstream of the orifice.

Further improvements in gas flow accuracy may require temperature control of the apparatus components. The temperature control may be such that the liquefied gas source is at higher temperature relative to the electrochemical device. The electrochemical device may require heat removal through a heat sink and cooling system in order to maintain lower vapor pressure than the liquefied gas source. The liquefied gas source and gas delivery lines may also be heated so that the vapor pressure is increased relative to the pressure in the electrochemical device. Heating of the liquefied gas source, gas delivery lines, and MFM may be performed with commercial heating elements, including heating blankets, heating rope, heating tape, or circulating air heaters. Electronic MFM instruments may require specific temperature control due to the internal heating from the instrument. Due to the temperature and pressure sensitivity of MFM instruments, the temperature control may be necessary for accurate mass flow readings.

In some embodiments of this invention, the filling process for electrochemical devices may have a preferred flow rate for accurate liquefied gas delivery. The preferred flow rate may depend on the heat removal at the electrochemical device due to the heat of condensation of the solvent, and the heat supplied at the liquefied gas source and delivery lines. The preferred flow rate may be necessary for obtaining accurate flow measurements from the mass flow measurement device. The preferred flow rate may be obtained by appropriate sizing of the gas lines, by appropriate sizing of the orifices, or by use of a mass flow controller.

In cases where it is desirable to operate the MFM at pressures below the vapor pressure of the liquefied gas, an orifice upstream of the MFM can be used. The upstream orifice creates a pressure drop during gas flow that is stable across the MFM to the downstream orifice. The pneumatic shut-off valves maintain the operation pressure when flow is stopped; therefore, the process pressure is consistent from one device fill to the next.

An alternative method for pressure control across the MFM is an upstream electronic pressure controller. A pressure controller contains a control valve and an integral transducer to maintain steady pressure. A pressure controller may improve pressure stability across the MFM, leading to improved liquefied gas fill accuracy.

This method for gas phase delivery of liquefied gas solvents for electrochemical devices may be automated using a CPU to monitor pressure and flow rate, as well as to control pneumatic shut-off valves. The CPU is connected to pressure transducers, both at the electrochemical device, and at the MFM, to ensure that choked flow conditions are sustained during the device fill process. The CPU monitors the MFM flow rate and total solvent mass transferred to the electrochemical device. When the CPU solvent mass monitor reaches the input mass, the CPU closes the pneumatic shut-off valves to stop flow to the electrochemical device. This automated system improves ease of use, efficiency, lowers cost of operation, and lowers the waste solvent, due to rapid calculation of accurate gas addition.

EXAMPLE EMBODIMENTS

What follows are ten non-limiting examples showing various embodiments of the present invention. One such embodiment is illustrated in FIG. 1. In setup 100-1, the liquefied gas solvent is supplied from a liquefied gas solvent source 1 (shown throughout this disclosure as a cylinder). The vapor of the liquefied gas solvent is passed through a mass flow meter 5 and an orifice 6. The orifice 6 controls the mass flow as described in the Description section above. In preferred embodiments of this invention, the orifice 6 has a diameter between 0.1 microns and 10000 microns, preferably between 1 micron and 1000 microns, more preferably between 10 microns and 500 microns. The orifice 6 has an upstream pressure P1 and a downstream pressure P2. The upstream pressure P1 is the operating pressure of mass flow meter 5. The downstream pressure P2 is less than approximately one-half P1 pressure, so that choked flow is sustained during the electrochemical device fill process. In preferred embodiments, the pressure ratio P2/P1 can be less than 0.99, preferably less than 0.75, more preferably less than 0.5. The components of the disclosed gas delivery apparatus are connected by metal, plastic, or ceramic tubing 14. In some embodiments, the components of the gas delivery apparatus are connected by tubing or piping of variable size, with an inner diameter larger than the size of the orifices. In some embodiments, the tubing may be ¹⁄₁₆-inch, ⅛-inch, ¼-inch, ½-inch, 1-inch, or 2-inch outer diameter. In some embodiments, the pipe size may be ⅛, ¼, ½, 1, 2 times, or greater than, the nominal pipe size. The vapor of the liquefied gas solvent is transferred through the orifice into the electrochemical device 11.

Figure 2:
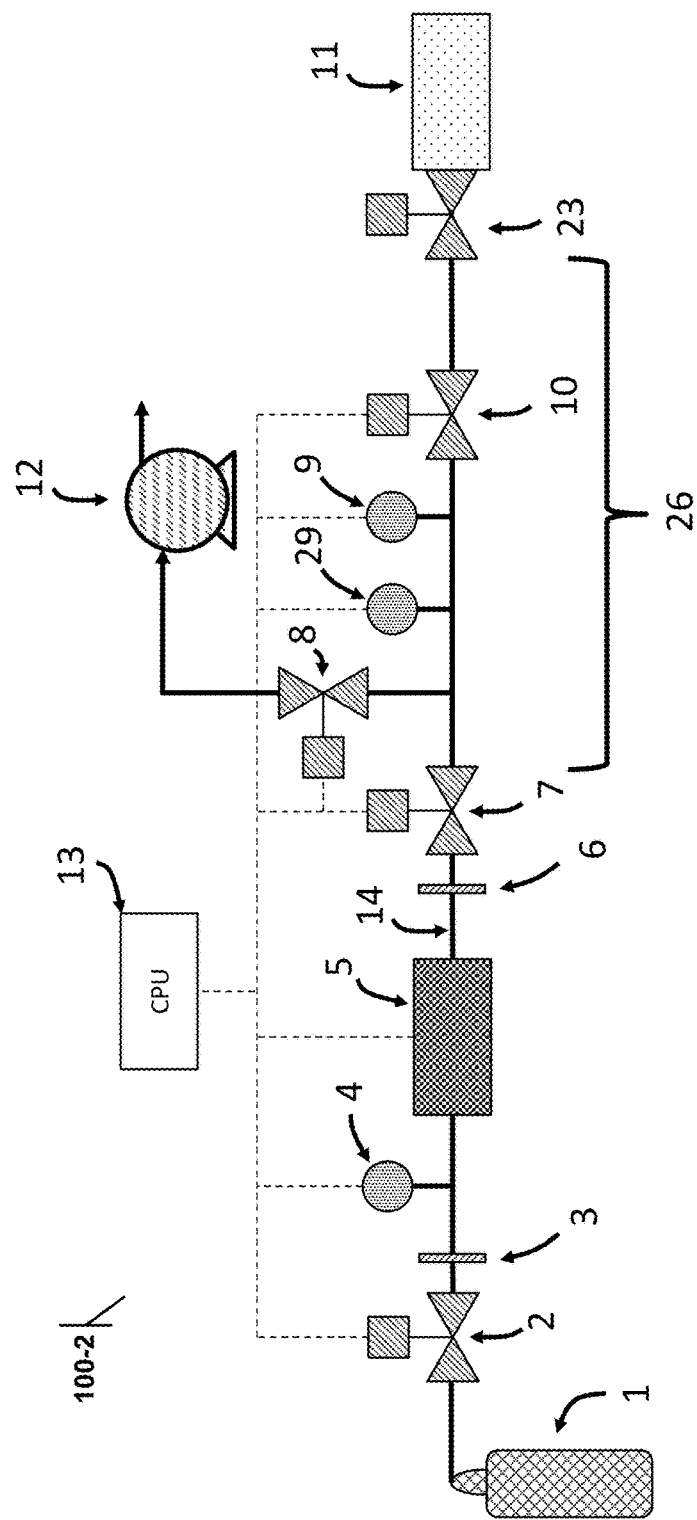
FIG. 2 is a block diagram showing an embodiment of the apparatus for liquefied gas solvent delivery to electrochemical devices, which includes additional pressure and flow control components, as well as an electronic monitoring system using a CPU.

Another embodiment of this invention is illustrated in FIG. 2. In setup 100-2, the liquefied gas solvent is supplied from a liquefied gas solvent source 1. The vapor of the liquefied gas solvent is passed through a valve 2 and an orifice 3. The orifice 3 causes a pressure drop. The pressure downstream of orifice 3 is monitored by a pressure monitor 4. The pressure downstream of orifice 3 serves as the operating pressure for the mass flow meter 5. The vapor is then passed through an orifice 6 downstream of the mass flow meter 5. The downstream section of valve 7 is evacuated by keeping the valve 7 closed and by opening valves 8, 10, while valve 2 is closed, so that the electrochemical device 11 can be evacuated by pump 12 to achieve the desired P2/P1 pressure ratio. The sizes of orifice 3 and orifice 6 are selected so that the pressure between the two, and across the mass flow meter 5, is steady during the fill process. In some embodiments, the sizes of orifice 3 and orifice 6 are nearly identical or within 0%, 0.1%, 0.5%, 1%, 5%, 10%, 20%, 50%, 75%, 100% or 200% of the measured diameter. The valves, pressure monitors, and mass flow meter can be controlled and monitored by a CPU 13 so that the entire process can be monitored and/or automated. During the fill process, valve 2, valve 7, and valve 10 are open, and valve 8 is closed so that the vapor from the liquefied gas solvent source 1 is transferred to the electrochemical device 11. The CPU 13 monitors the accumulated mass flow by integrating the readings of the mass flow meter 5. When the total mass flow reaches a predetermined input value, valve 2, valve 7, valve 10 and valve 23 are closed, and the electrochemical device 11 is removed.

What is important to note in FIG. 2 is that the connection between the mass flow meter 5 and the electrochemical device 11 includes a waste volume 26. When the various valves are closed after filing the electrochemical device 11, there is still some amount of liquefied gas mass within the waste volume 26. This waste mass should be accounted for in the calculation of whether enough gas solvent has been introduced into the electrochemical device 11. For example, experiments have shown that in a very small waste volume, the amount of gas mass can be as high as 1 gram when the waste volume 26 is at 0 degrees Celsius, down to 0.1 grams at −70 degrees Celsius. If the goal is to fill the electrochemical device 11 with 5 grams of solvent gas, ignoring the waste volume could amount to a 20% error, which affects the performance of the electrochemical device. For this reason, the connection between the flow meter 5 and electrochemical device 11 includes a pressure sensor 9 that detects the pressure of the waste volume and a temperature sensor 29 that detects the temperature of the waste volume 26. By controlling the temperature and pressure of the waste volume 26 within a known volume, the amount of (electrolyte) mass within the waste volume 26 can be determined and accounted for when filling the electrochemical device 11.

If the electrochemical device 11 is filled at very low temperatures (−70 degrees C.), then the pressure and density of the gas in the waste volume 26 will remain low. If the temperature of the waste volume 26 is accurate to within 1 degree Celsius, then the uncertainty of the mass calculation in the waste volume relative to the mass in the electrochemical device cell would likely be small, yielding a highly accurate electrochemical device fill. If, however, the electrochemical device is filled at high temperatures (0 degrees C.), then the pressure and density of the gas in the waste volume 26 are much higher. Even if the temperature of the waste volume 26 is accurate to within 1 degree Celsius, then the uncertainty of the mass calculation in the waste volume 26 relative to the mass in the electrochemical device 11 will be significantly higher.

Also, when multiple gas solvents are used (see FIG. 10 below), each liquefied gas solvent source may be used serially, one at a time, to fill up the electrochemical device. Valves 2, 7 and 10 may be closed, and valve 8 opened, and the pump 12 actuated to evacuate the waste volume before switching to the next liquefied gas solvent source. This prevents the waste mass from being included in the electrochemical device fill. Alternatively, the setup 100-2 needs to evacuate between sources if the waste volume is accounted for in the fill process. For example, if 10 grams of gas A, 10 grams of gas B and 10 grams of gas C are needed, the source for gas A may be opened to fill the electrochemical device. Because the amount of liquefied gas supplied to the flow meter is known, the fill of gas A can continue until 10 grams have been supplied. The same is true for gas B. But for gas C, the final component, the temperature and pressure of the waste volume may indicate that a gram of gas remains in the waste volume, so gas C should be allowed to deliver 11 grams to the flow meter.

When the system is loaded with a new electrochemical device which is also being filled with the A+B+C gas combination, then the gram of gas C in the waste volume should be evacuated by closing valves 2 and 10, opening valve 8 and actuating pump 12.

Another embodiment of this invention is illustrated in FIG. 3. In setup 100-3, the electrochemical device 11 may be connected to a heat sink 15 during the fill process. The heat sink 15 limits the temperature increase during condensation of the liquefied gas solvent in the electrochemical device 11. The heat sink 15 may be connected to a refrigeration unit so that the electrochemical device 11 can be cooled below room temperature. The electrochemical device 11 may be cooled to less than 50 degrees Celsius, preferably to less than 25 degrees Celsius, more preferably to less than 0 degrees Celsius, even more preferably to less than −20 degrees Celsius. The heat sink 15 may comprise a thermally conductive material in contact with the electrochemical device 11. The heat sink 15 may be a solid container, a bed of metal shot, a liquid bath, an ice bath, a dry ice bath, or a gas flow. The refrigeration unit may be a circulating chiller, Peltier cooler, or a refrigerated gas. The electrochemical device 11 may also be pre-cooled below the liquefied gas solvent source temperature to enable condensation of liquefied gas into the device 11. In a preferred embodiment of this invention, the electrochemical device 11 is maintained at temperatures below the liquefied gas solvent source temperature. Those skilled in the art recognize that a refrigerated heat sink 15 in contact with the electrochemical device 11 may be necessary for choked flow that is P2 less than one-half P1 through orifice 6.

Another embodiment of this invention is illustrated in FIG. 4. In setup 100-4, the temperature of the liquefied gas solvent source 1 and the gas lines up to orifice 6 are controlled by a temperature control element 16. In one embodiment, the temperature deviation between the liquefied gas solvent source and the gas delivery lines is less than 10 degrees Celsius, preferably less than 5 degrees Celsius, more preferably less than 1 degree Celsius, even more preferably less than 0.1 degrees Celsius. The temperature may be controlled to be higher than room temperature. The temperature may be controlled between −30 degrees Celsius and 100 degrees Celsius, preferably between 0 degrees Celsius and 50 degrees Celsius, more preferably between 20 degrees Celsius and 30 degrees Celsius. The temperature control element 16 may maintain a variance of temperature to within +/−2.0 degrees Celsius, and more preferably to within 0.5 degrees Celsius during the fill process. As the liquefied gas solvent source 1 delivers gas during the fill process, it will cool, and the variation in temperature of the gas may affect the accuracy of the flow meter 5. By using a temperature control element 16 to maintain a near constant temperature during the fill process, the inaccuracies of the flow meter 5 can be minimized. Those skilled in the art recognize that the temperature of the liquefied gas solvent source 1 may be adjusted to provide sufficient vapor pressure and flow rate. The temperature control may be achieved using heating blankets, heating tape, heating rope, or thermally regulated enclosures.

Another embodiment of this invention is illustrated in FIG. 5. In setup 100-5, the downstream side of orifice 6 (which is also the waste volume) is temperature-controlled using a temperature control element 17. The temperature may be controlled between −30 degrees Celsius and 100 degrees Celsius, preferably between 0 degrees Celsius and 50 degrees Celsius, more preferably between 20 degrees Celsius and 30 degrees Celsius. The temperature control may be achieved using heating blankets, heating tape, heating rope, or thermally regulated enclosures. The temperature control element 17 may maintain a variance of temperature within the waste volume to within +/−2.0 degrees Celsius, and more preferably to within 0.5 degrees Celsius. By maintaining the waste volume to a low temperature variance, the reading from the temperature sensor 29 is more accurate for the entire waste volume. It should also be noted that the temperature sensor 29 may be substituted for the temperature control element 17. When there is such a substitution, the temperature control element 17 may be set to a certain preset temperature, and that set temperature can be used, along with the pressure reading from the pressure sensor 9, to determine the gas mass in the waste volume. No separate temperature sensor 29 would be required.

Another embodiment of this invention is illustrated in FIG. 6. In setup 100-6, the orifice upstream of the mass flow meter 5 is not used; therefore, the pressure across the MFM is determined by the vapor pressure of the liquefied gas source.

Figure 7:
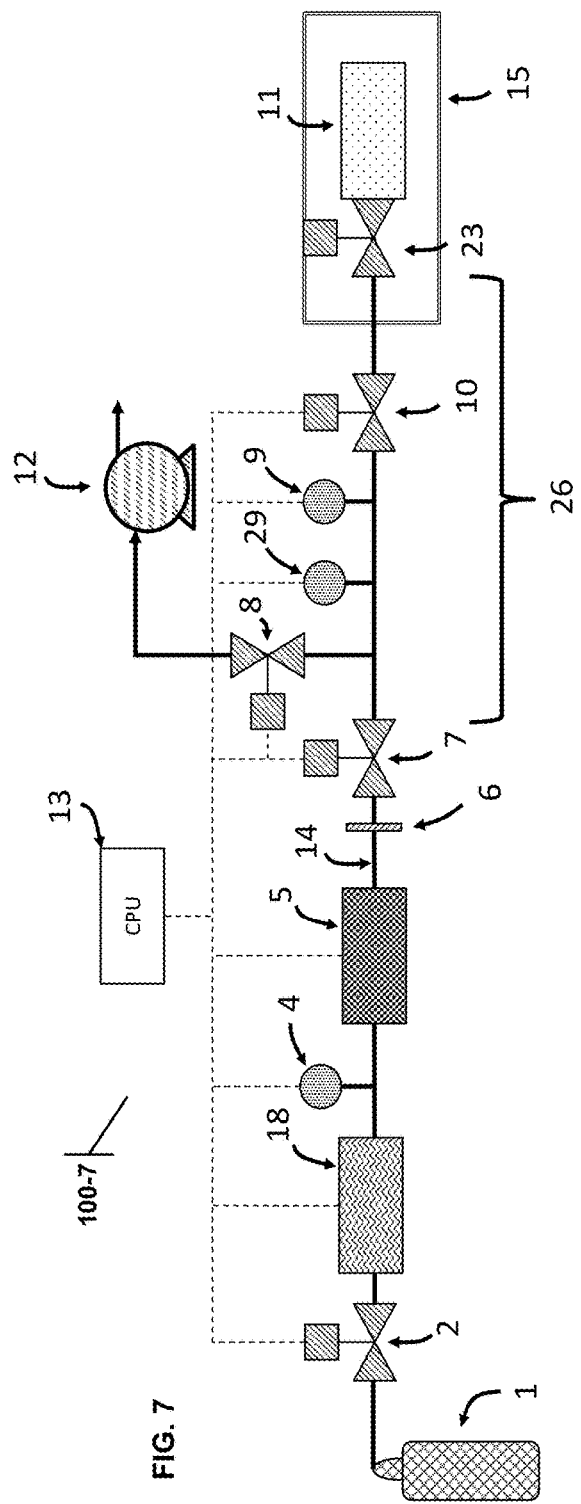
FIG. 7 is a block diagram showing an embodiment of the apparatus for liquefied gas solvent delivery to electrochemical devices, where an electronic pressure controller is used.

Another embodiment of this invention is illustrated in FIG. 7. In setup 100-7, the upstream orifice of the mass flow meter 5 is replaced by a pressure regulator/controller 18. The pressure controller 18 is connected to the CPU 13 to electronically control the pressure at the mass flow meter 5. As the liquefied gas solvent source 1 delivers gas during the fill process, it will cool and result in a variation in the temperature and the pressure of the gas, which in turn may affect the accuracy of the flow meter 5. As the liquefied gas solvent condenses in the electrochemical device 11, the temperature in the electrochemical device 11 may increase. Therefore, the pressure downstream of the flow meter 5 will increase, and this increasing downstream pressure may also affect the accuracy of the flow meter 5. The pressure regulator/controller 18 may maintain pressure variance in the connection between the pressurized source 1 and the flow meter 5 to within +/−25 kPA during the filling process. The pressure regulator/controller 18 may provide accurate pressure control and stability required for filling electrochemical devices 11. Tests have shown that without a pressure regulator/control 18 and without accounting for the waste volume, mass errors of 20-30% may be realized.

Figure 8:
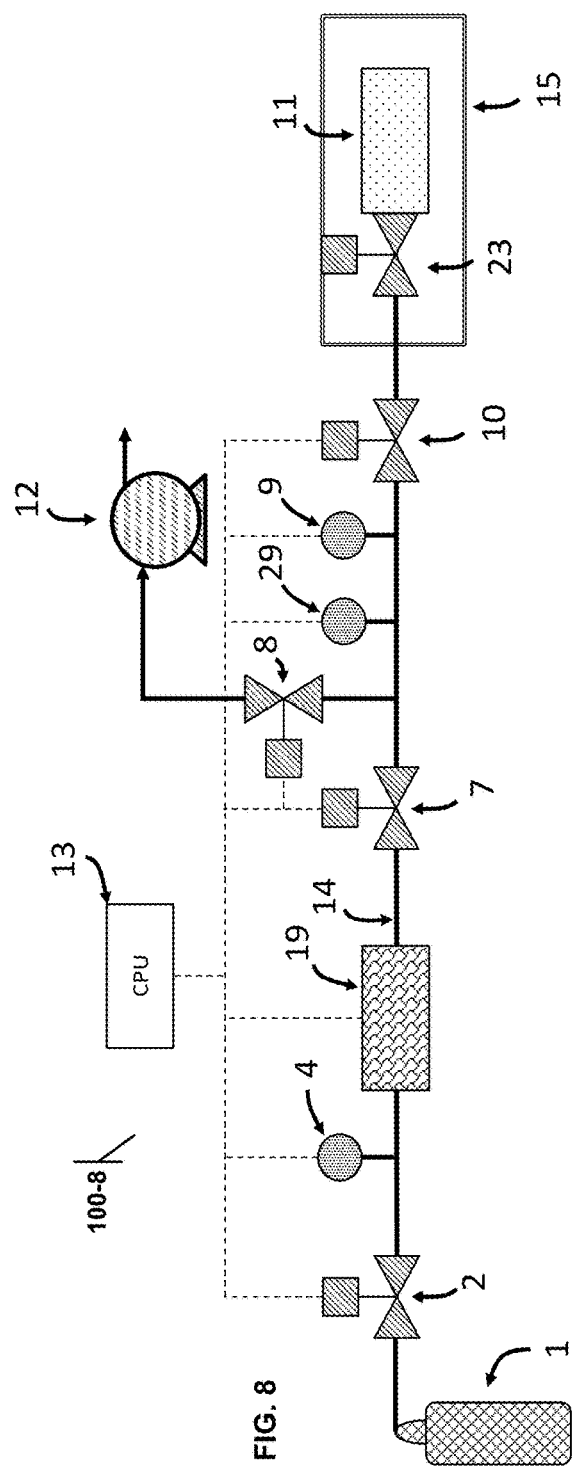
FIG. 8 is a block diagram showing an embodiment of the apparatus for liquefied gas solvent delivery to electrochemical devices, where a mass flow controller is used.

Another embodiment of this invention is illustrated in FIG. 8. In setup 100-8, the use of orifices is optional, and in place of a mass flow meter 5, a mass flow controller 19 is used. A mass flow controller 19, which operates at sufficiently high pressures, is comprised of a flow sensing unit and a flow control unit, which is typically an adjustable orifice. The mass flow controller 19 is connected to the CPU 13 to electronically control the flow to the electrochemical device 11. The mass flow controller 19 is subject to the same temperature and pressure stability requirements as the mass flow meter 5 described in the embodiment in FIG. 6. Therefore, the preferred configuration would have temperature and pressure control mechanisms for the liquefied gas solvent source 1 and the gas line.

Figure 9:
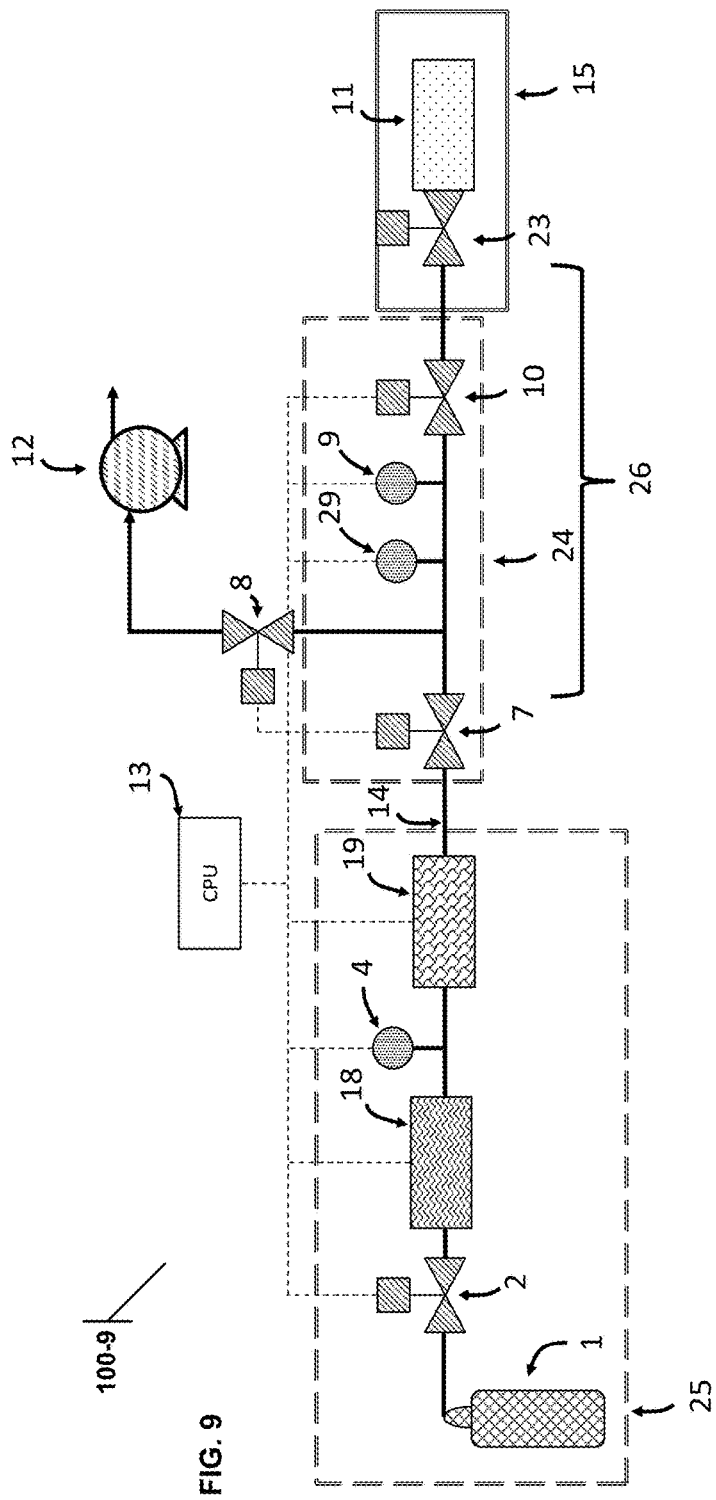
FIG. 9 is a block diagram showing an embodiment of the apparatus for liquefied gas solvent delivery to electrochemical devices, where two heaters, a pressure controller, and a mass flow controller are used.

Another embodiment of this invention is illustrated in FIG. 9. The setup 100-9 comprises of a heater 25 from the liquefied gas solvent source 1 to the mass flow controller 19, a pressure controller 18 upstream of the mass flow controller, and a heater 24 downstream of the mass flow controller for thermal control. This configuration may provide improved accuracy for mass delivery to the electrochemical device 11.

Figure 10:
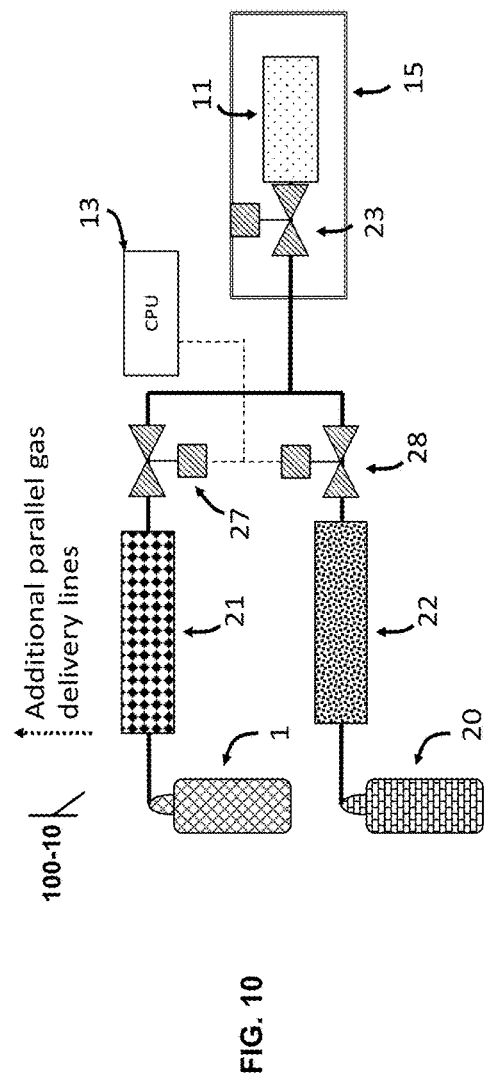
FIG. 10 is a block diagram showing an embodiment of the apparatus for liquefied gas solvent delivery to electrochemical devices, where two or more gas delivery lines are used.

Another embodiment of this invention is illustrated in FIG. 10. The setup 100-10 comprises two or more parallel gas delivery lines supplying liquefied gas solvent to the electrochemical device 11. Liquefied gas source 1 is connected to gas delivery line 21, and liquefied gas source 20 is connected to gas delivery line 22, and both gas delivery lines 21, 22 deliver gas to the electrochemical device 11. This embodiment may be extended to any plurality of liquefied gas sources and gas delivery lines. The gas delivery lines may comprise of the components of any of the above embodiments for delivering accurate masses of liquefied gas solvent at the desired flow rates.

In another embodiment of this invention, the pressure P2 can exceed one-half the pressure P1. This operating condition may not provide choked flow through an orifice; however, it is still possible to achieve accurate mass fills for liquefied gas solvent into electrochemical devices. In a preferred embodiment, the apparatus would only have an orifice downstream of the mass flow meter 5 such as in FIG. 6 and FIG. 7. In FIG. 6 and FIG. 7, the flow rate through orifice 6 may drop as P2 increases to larger than one-half of P1. If the operating pressure of the mass flow meter 5 is maintained, and P1 is greater than P2, then the flow monitoring may be accurate within the specifications of the instrument. In FIG. 8, the mass flow controller 19 may control the flow within the specifications of the instrument if the calibrated inlet operating pressure of the mass flow controller is sustained, and the pressure differential between P1 and P2 is within the instrument specification. Provided the above operating conditions are met for the embodiments shown in FIG. 6, FIG. 7, and FIG. 8, it is possible to achieve accurate electrochemical device fills with P2 exceeding one-half of P1.

An operation process is described for the embodiment shown in FIG. 7. Initially, the gas line pressure downstream of valve 7 is at a vacuum, including the electrochemical device 11. Between valve 7 and the pressure controller 18, the pressure is at the calibrated pressure of the mass flow controller (MFC) 19. Upstream of the pressure controller 18, the pressure may be the vapor pressure of the gas in the liquefied gas solvent source 1, or it may be any value lower than the vapor pressure. The electrochemical device 11 may be in a heat sink 15, and the liquefied gas solvent source 1 may be at room temperature.

Referring to FIG. 9, with the liquefied gas solvent source 1 open, and valves 2, 7, 10, and 23 open, gas flows into the electrochemical device 11. The flow rate is set on the MFC. The MFC provides the mass flow rate signal to the CPU. The pressure controller maintains the calibrated MFC pressure between the pressure controller and the MFC so that the MFC flow rate signal is accurate.

The CPU program integrates the MFC flow rate to calculate total mass flow downstream of valve 7 and the mass in the electrochemical device 11. The mass in the electrochemical device 11 is calculated by subtracting the mass contained in the waste volume 26 (i.e., between valve 7 and valve 23) from the total mass flow. The mass that is subtracted out is determined by the pressure in the gas line and the temperature (derived from sensors 9 and 29).

Data tables of the gas density at the operating temperature and pressure are used to precisely determine the density of the gas in the waste volume 26 (i.e., between valve 7 and valve 23). The waste volume is known with high accuracy. Multiplying the density by the volume provides the mass delivered by the MFC but did not go into the electrochemical device. The pressure in the waste volume 26 is not static during the fill; therefore, the amount of gas that gets subtracted from the electrochemical device 11 is updated during the fill process.

When the CPU program calculation for the mass in the electrochemical device 11 reaches the setpoint, valves 2, 7, 10, and 23 are closed, and the tubing between valves 7 and 23 is evacuated.

The process may be repeated if the electrochemical device 11 requires a mixture of liquefied gas solvents. Subsequent liquefied gases delivered to the electrochemical device 11 may require some process modifications to achieve accurate mass delivery. An apparatus, as illustrated in FIG. 10, may be suitable for creating a mixture of liquefied gases, with each gas having its own control valve 27, 28. Accurate delivery of subsequent gases to the electrochemical device 11 may be achieved using Dalton's law of partial pressures to account for the vapor already in the electrochemical device 11. Accurate delivery of subsequent gases to the electrochemical device 11 may alternatively be achieved using a check valve upstream of the electrochemical device 11 to prevent back streaming of the vapor inside the electrochemical device 11. Accurate delivery of subsequent gases to the electrochemical device 11 may alternatively be achieved using a pump upstream of the electrochemical device 11 to compensate for the pressurized gases preexisting inside the electrochemical device 11.

The mass flow meters and/or mass flow controllers may include, but are not limited to, thermal type flow meters or Coriolis type flow meters. The pressure controllers may include electronic or mechanical pressure controllers, or hybrids thereof. The orifices may include, but are not limited to, a thin metal plate gasket, a nozzle, a restrictor tube, a disc, a fitting, or a control valve. The disclosed apparatuses may consist of 0, 1, 2, or greater than 2 orifices, and the valves may be, but are not limited to, diaphragm valves, needle valves, butterfly valves, ball valves, or gate valves. The liquefied gas solvent source heat source and/or the gas line heat source may be, but are not limited to, a heating blanket, heating tape, heating rope, or thermally regulated enclosures. Likewise, the mass flow meter or mass flow controller heat sources may be, but are not limited to, heating blankets, heating tape, heating rope, or thermally regulated enclosures. The automation and instrument readings may be performed with a data acquisition unit, electronic control panel, PLC, HMI, or similar electronic control devices.

Figure 16:
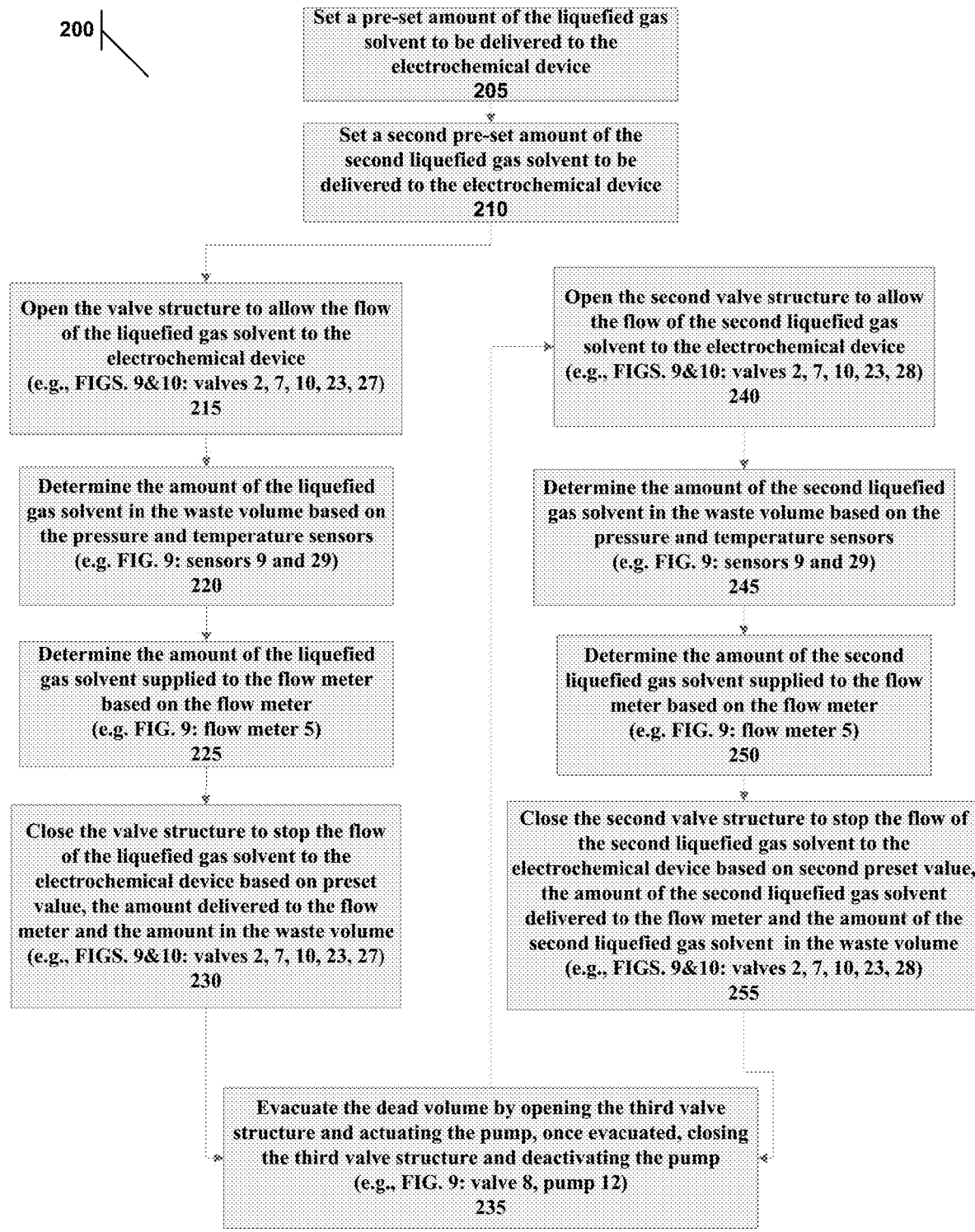
FIG. 16 is a flow chart illustrating a method of filling an electrochemical device with a liquefied gas solvent that has a vapor pressure above an atmospheric pressure of 100 kPa at a room temperature of 293.15 K.

Turning to FIG. 16, a method 200 of filling an electrochemical device with two liquefied gas solvents that each have a vapor pressure above an atmospheric pressure of 100 kPa at a room temperature of 293.15 K is illustrated. In steps 205 and 210, the amounts of the first and second liquefied gas solvents are set. In step 215, the filling of the electrochemical device 11 begins by opening the valve structure to allow the flow of the liquefied gas solvent to the electrochemical device 11 (e.g., FIGS. 9&10: valves 2, 7, 10, 23, if multi-gas open valve 27 also). Step 220 determines the amount of the liquefied gas solvent in the waste volume 26 by taking measurements from the pressure and temperature sensors (e.g. FIG. 9: sensors 9 and 29). To determine whether the electrochemical device 11 has been filled sufficiently, the preset amount from step 205 may be added to the waste volume 26 amount from step 220 and compared to the amount of the liquefied gas solvent supplied to the flow meter from step 225. On the basis of that comparison, the valve structures may be closed to stop the flow of the liquefied gas solvent to the electrochemical device in step 230 (e.g., FIGS. 9&10: valves 2, 7, 10, 23; if multi-gas close valve 27 also).

The third valve structure may be opened, and the pump may be actuated to evacuate the dead or waste volume 26 (e.g., FIG. 9, valve 8, pump 12) in step 235. Once evacuated, the third valve structure is closed, and the pump is deactivated. Now the method is ready to add the second liquefied gas solvent to the electrochemical device 11 in steps 240- 255 in a similar fashion to the first liquefied gas solvent filling. First, in step 240, the second valve structure is opened to allow the flow of the second liquefied gas solvent to the electrochemical device (e.g., FIGS. 9&10: valves 2, 7, 10, 23 and 28). Step 245 determines the amount of the second liquefied gas solvent in the waste volume 26 by taking measurements from the pressure and temperature sensors (e.g. FIG. 9: sensors 9 and 29). To determine whether the electrochemical device 11 has been filled sufficiently with the second liquefied gas solvent, the preset amount from step 210 may be added to the waste volume 26 amount from step 245 and compared to the amount of the second liquefied gas solvent supplied to the flow meter from step 250. On the basis of that comparison, the valve structures may be closed to stop the flow of the second liquefied gas solvent to the electrochemical device 11 in step 255 (e.g., FIGS. 9&10: valves 2, 7, 10, 23, 28). The waste volume 26 can be evacuated again by performing step 235.

If a third, fourth or greater number of liquefied gas solvents are needed steps 235-255 may be repeated, except that each of the liquefied gas solvent sources would have its own unique valve structure (such as valves 27 and 28 in FIG. 10) that would be actuated to allow the flow of that gas into the electrochemical device 11.

COMPARATIVE EXAMPLES

Example 1

Figure 11:
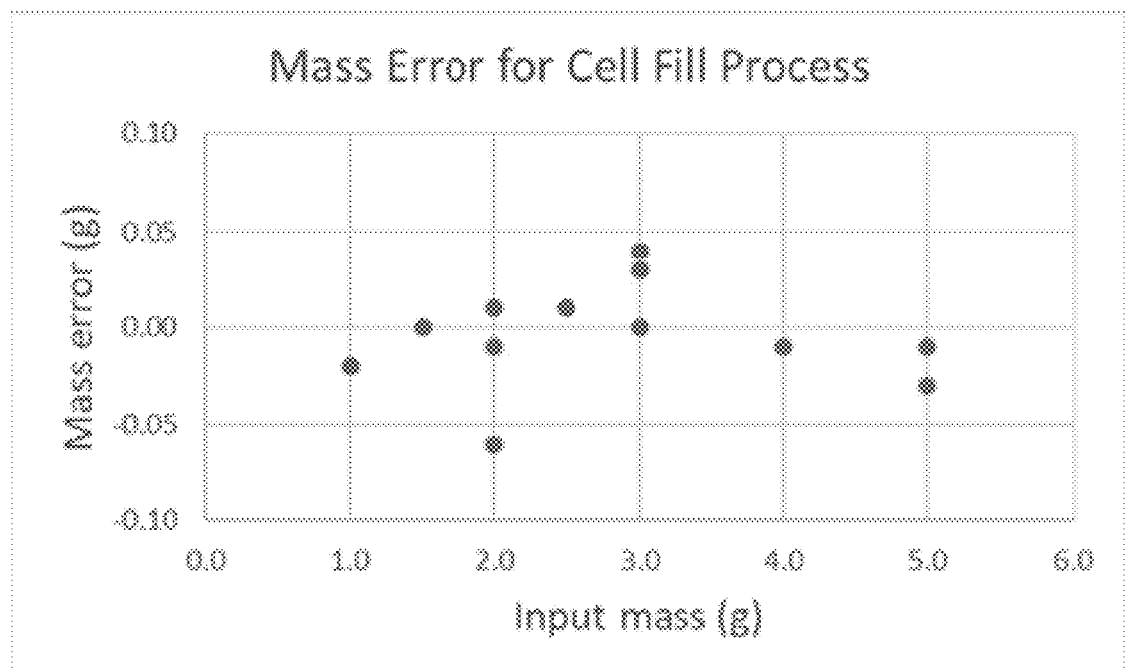
FIG. 11 is a graph of electrochemical device fill mass errors versus the input mass for fluoromethane electrochemical device fills.
Figure 12:
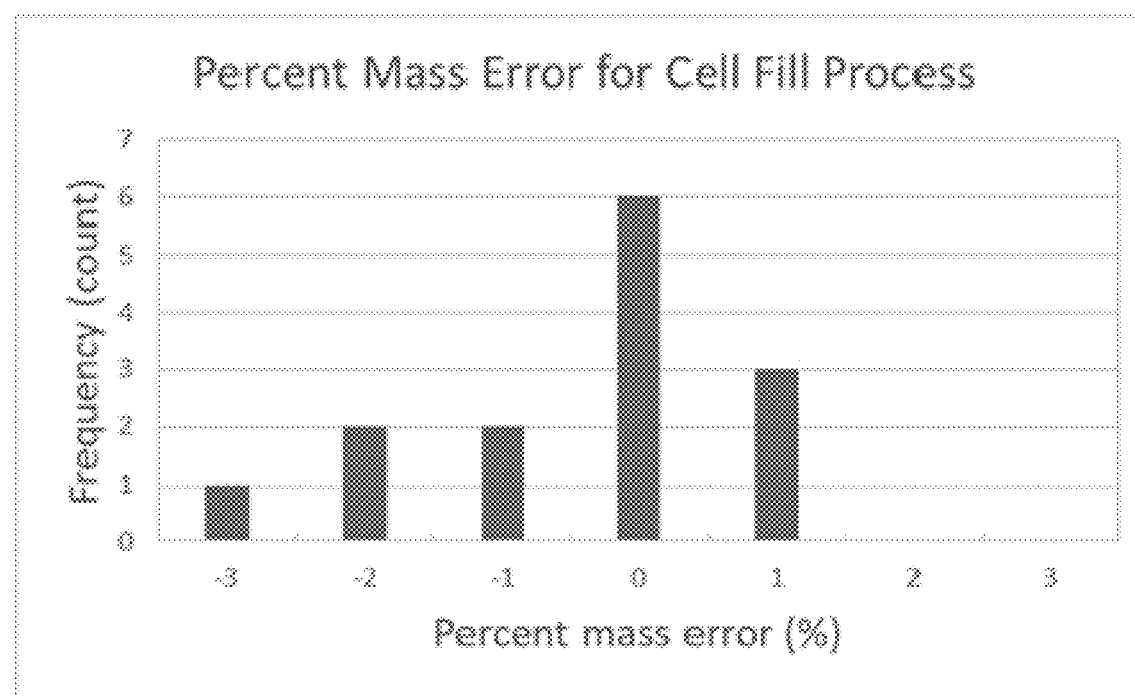
FIG. 12 is a histogram showing the distribution of percent mass errors for fluoromethane electrochemical device fills.

FIG. 11 shows the mass error for electrochemical device filling processes between 1 gram and 5 grams of fluoromethane using an apparatus design, as shown in FIG. 7. The electrochemical device was held at a temperature of approximately −70 degrees Celsius. Each data point represents a separate electrochemical device filling process, with the target fill mass indicated on the x-axis, and the mass error in the electrochemical device after completing the filling process indicated on the y-axis. The masses were recorded using a scale with accuracy of ±0.01 grams. The mass errors in 13 of the 14 processes are less than ±0.05 grams, and in 9 of the 14 processes the mass errors are less than ±0.02 grams. FIG. 12 shows a histogram of the percent mass error for the electrochemical device fill processes in FIG. 11, with the errors were rounded to the nearest integer.

Example 2

Figure 13:
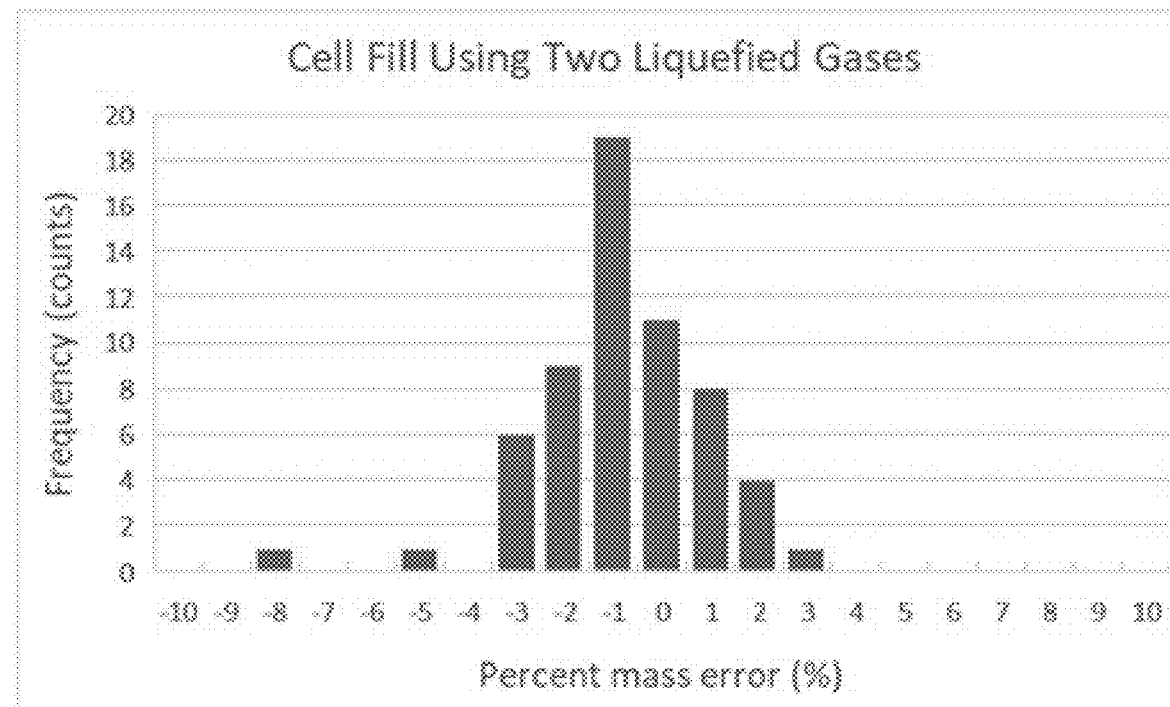
FIG. 13 is a histogram showing the distribution of the percent mass error for the electrochemical device fill processes using two liquefied gases.

FIG. 13 shows a histogram of the percent mass error for the electrochemical device fill processes using two liquefied gases. The electrochemical device was held at a temperature of approximately −70 degrees Celsius. The percent mass errors were rounded to the nearest integer and the median percent mass error is −0.7%.

Example 3

Figure 14:
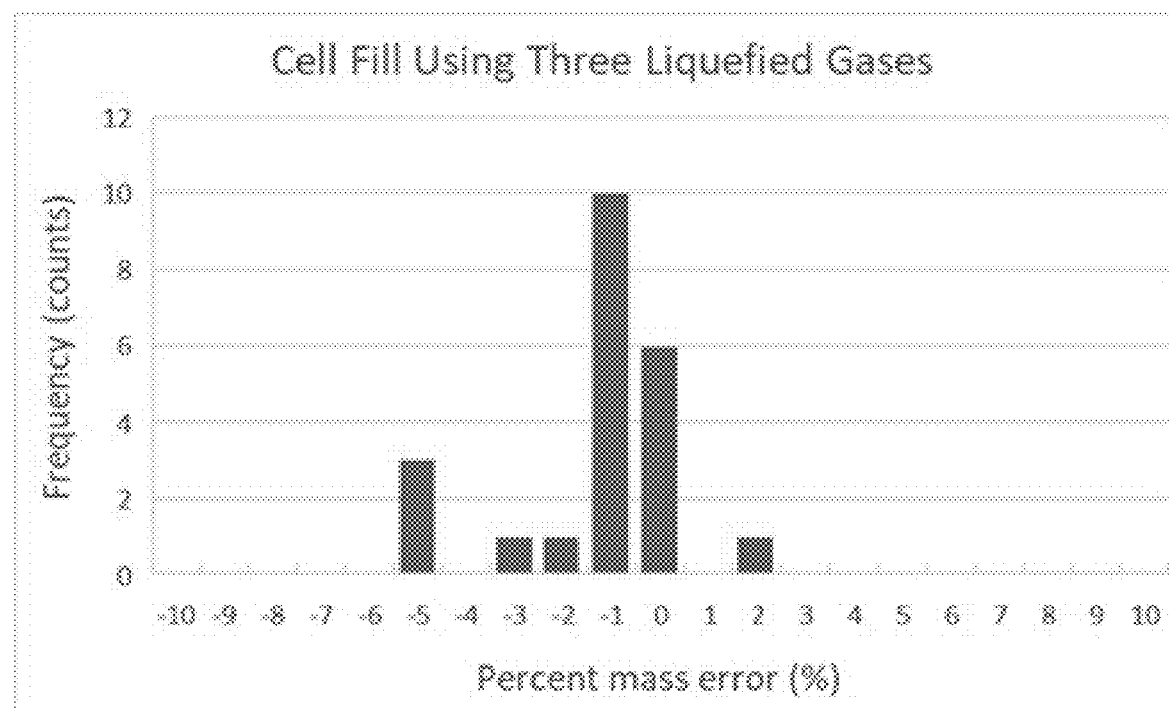
FIG. 14 is a histogram showing the distribution of the percent mass error for the electrochemical device fill processes using three liquefied gases.

FIG. 14 shows a histogram of the percent mass error for the electrochemical device fill processes using three liquefied gases. The electrochemical device was held at a temperature of approximately −70 degrees Celsius. The percent mass errors were rounded to the nearest integer and the median percent mass error is negative −0.9%.

Example 4

Figure 15:
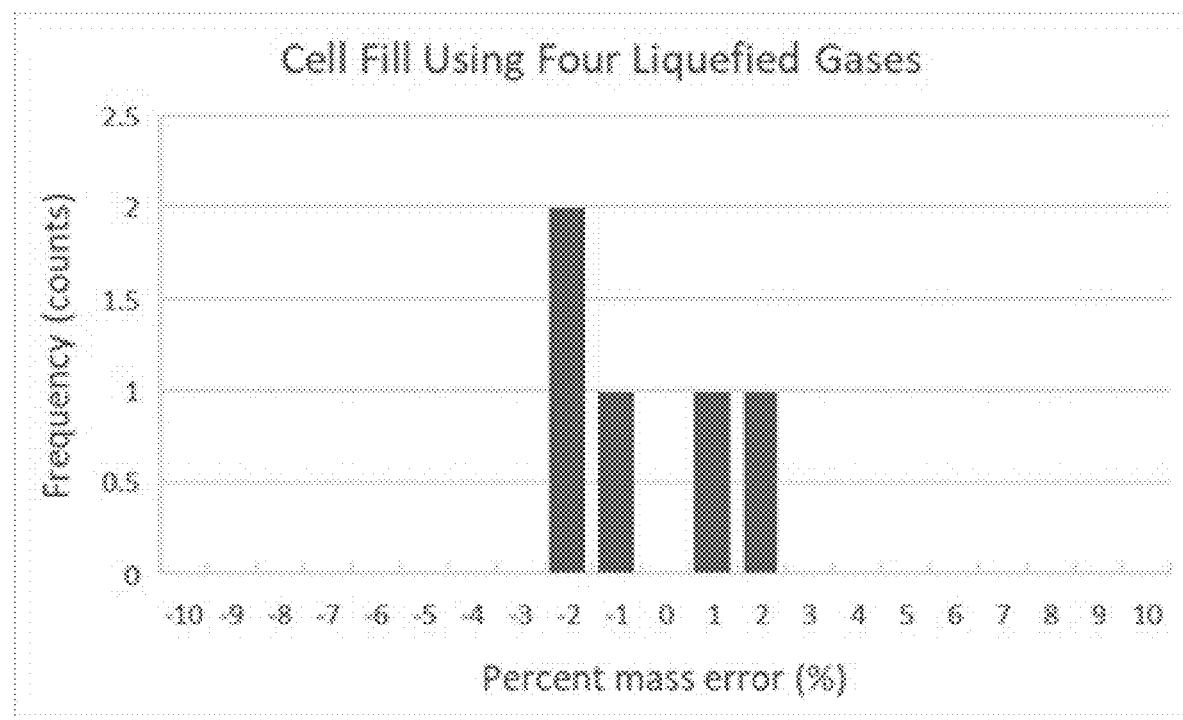
FIG. 15 is a histogram showing the distribution of the percent mass error for the electrochemical device fill processes using four liquefied gases.

FIG. 15 shows a histogram of the percent mass error for the electrochemical device fill processes using four liquefied gases. The electrochemical device was held at a temperature of approximately −70 degrees Celsius. The percent mass errors were rounded to the nearest integer and the median percent mass error is −1.1%.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made, based on what is described and illustrated in this patent document.

The invention claimed is:

1. A method of forming a liquefied gas electrolyte in an electrochemical device, the method comprising:
   providing a fill setup comprising:
      a liquefied gas solvent source connected to a flow meter, wherein the liquefied gas solvent has a vapor pressure above an atmospheric pressure of 100 kPa at a room temperature of 293.15 K;
      the flow meter connected to the electrochemical device; and
   a valve structure constructed to allow the liquefied gas solvent to flow from the liquefied gas solvent source to the electrochemical device;
      wherein the connection between the flow meter and the electrochemical device comprises:
         a waste volume;
         a pressure sensor constructed to detect the pressure of the waste volume; and
         a temperature sensor constructed to detect the temperature of the waste volume;
   a. setting a preset amount of the liquefied gas solvent to be delivered to the electrochemical device;
   b. adding a salt to the electrochemical device;
   c. actuating the valve structure to allow for the flow of the liquefied gas solvent to the electrochemical device, wherein the liquefied gas solvent mixes with the salt to form a liquefied gas electrolyte;
   d. determining the amount of the liquefied gas solvent in the waste volume based on the pressure and temperature sensors;
   e. determining the amount of the liquefied gas solvent supplied based on the flow meter;
   f. actuating the valve structure to stop the flow of the liquefied gas solvent to the electrochemical device based on the preset amount in step (a), the amount in step (d) and the amount in step (e).

2. The method of claim 1, wherein the flow meter is a mass flow meter and step (e) further comprises reading from the mass flow meter.

3. The method of claim 1, wherein the flow meter is a mass flow controller and the method further comprises:
   setting the mass flow controller to a preset flow rate; and
   step (e) is further based on the amount of time the liquefied gas solvent has flowed through the mass flow controller.

4. The method of claim 1, wherein step (f) is further based on a comparison of the amount in step (e) to the sum of the preset in step (a) and the amount in step (d).

5. The method of claim 1, wherein the fill setup comprises a temperature control element constructed to maintain a variance of temperature within the waste volume to within +/− 2.0 degrees Celsius during step (d).

6. The method of claim 1, wherein the fill setup comprises a temperature control element constructed to maintain the connection between the liquefied gas solvent source and the flow meter to within +/− 2.0 degrees Celsius during steps (c)-(e).

7. The method of claim 1, wherein the fill setup comprises a pressure regulator or pressure controller constructed to maintain the connection between the pressurized source and the flow meter to within +/− 25 kPA variance during steps (c)-(e).

8. The method of claim 1, wherein the fill setup comprises a second liquefied gas solvent source connected to a flow meter and a second valve structure constructed to allow the liquefied gas solvent to flow from the second liquefied gas solvent source to the electrochemical device, the method further comprising:
   a2. setting a second preset amount of the liquefied gas solvent from the second liquefied gas solvent source to be delivered to the electrochemical device;
   c2. actuating the second valve structure to allow for the flow of the second liquefied gas solvent to the electrochemical device;
   d2. determining the amount of the second liquefied gas solvent in the waste volume based on the pressure and temperature sensors;
   e2. determining the amount of the second liquefied gas solvent supplied based on the flow meter;
   f2. actuating the second valve structure to stop the flow of the second liquefied gas solvent to the electrochemical device based on the second preset amount in step (a2), the amount in step (d2) and the amount in step (e2).

9. The method of claim 8, wherein steps (c2)-(e2) are performed after step (f).

10. The method of claim 9, wherein the connection between the flow meter and the electrochemical device comprises a third valve structure and a pump between the third valve structure and the flow meter, the method further comprising:
    prior to performing steps (c2)-(e2), the third valve structure is closed, and the pump is actuated to evacuate the waste volume of the liquefied gas solvent.

11. The method of claim 1, wherein the liquefied gas solvent is selected from the group consisting of: fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, molecular oxygen, molecular nitrogen, carbon monoxide, carbon dioxide, sulfur dioxide, dimethyl ether, nitrous oxide, nitrogen dioxide, nitrogen oxide, carbon disulfide, hydrogen fluoride, hydrogen chloride, combination thereof, and isomers thereof.

12. A fill setup for forming a liquefied gas electrolyte in an electrochemical device, the setup comprising:
   a salt inside the electrochemical device;
   a liquefied gas solvent source connected to a flow meter, wherein the liquefied gas solvent has a vapor pressure above an atmospheric pressure of 100 kPa at a room temperature of 293.15 K;
   the flow meter connected to the electrochemical device;
   a valve structure constructed to allow the liquefied gas solvent to flow from the liquefied gas solvent source to the electrochemical device;
   wherein the connection between the flow meter and electrochemical device comprises:
      a waste volume;
      a pressure sensor constructed to detect the pressure of the waste volume; and
      a temperature sensor constructed to detect the temperature of the waste volume;
   a controller connected to the flowmeter, valve structure, pressure sensor and temperature sensor, the controller adapted to perform the following steps:
      a. receiving a preset amount of the liquefied gas solvent to be delivered to the electrochemical device;
      b. actuating the valve structure to allow for the flow of the liquefied gas solvent to the electrochemical device;
      c. determining the amount of the liquefied gas solvent in the waste volume based on the pressure and temperature sensors;
      d. determining the amount of the liquefied gas solvent supplied based on the flow meter;
      e. actuating the valve structure to stop the flow of the liquefied gas solvent to the electrochemical device based on the preset amount in step (a), the amount in step (c) and the amount in step (d);
   wherein the liquefied gas solvent mixes with the salt inside the electrochemical device to form a liquefied gas electrolyte.

13. The setup of claim 12, wherein the flow meter is a mass flow meter, and step (d) further comprises taking a reading from the mass flow meter.

14. The setup of claim 12, wherein the flow meter is a mass flow controller, and the controller is adapted to perform the steps of:
   setting the mass flow controller to a preset flow rate; and
   step (d) is further based on the amount of time the liquefied gas solvent has flowed through the mass flow controller.

15. The setup of claim 12, wherein step (e) is further based on a comparison of the amount in step (d) to the sum of the preset in step (a) and the amount in step (c).

16. The setup of claim 12, further comprising a temperature control element constructed to control the temperature of the waste volume, wherein the temperature control element is connected to the controller, and wherein the controller is adapted to perform the following step:
   maintain a variance of temperature within the waste volume to within +/- 2.0 degrees Celsius during step (c).

17. The setup of claim 16, wherein the temperature control element comprises a heater.

18. The setup of claim 12, further comprising a temperature control element constructed to control the temperature of the connection between the liquefied gas solvent source and the flow meter, wherein the temperature control element is connected to the controller, and wherein the controller is adapted to perform the following step:
   maintain the connection between the pressurized source and the flow meter to within +/- 2.0 degrees Celsius during steps (b)-(e).

19. The setup of claim 18, wherein the temperature control element comprises a heater.

20. The setup of claim 12, further comprising a pressure regulator or pressure controller constructed to maintain the connection between the pressurized source and the flow meter to within +/- 25 kPA variance during steps (b)-(e).

21. The setup of claim 12, wherein the flow meter comprises a mass flow meter or a mass flow controller.

22. The setup of claim 12, wherein the connection between the flow meter and the electrochemical device comprises a constricting flow control orifice.

23. The setup of claim 12, wherein the connection between the pressurized source and the flow meter comprises a constricting flow control orifice.

24. The setup of claim 12, further comprising:
   a second liquefied gas solvent source connected to a flow meter; and
   a second valve structure constructed to allow the liquefied gas solvent to flow from the second liquefied gas solvent source to the electrochemical device;
   wherein the controller is connected to the second valve structure and is adapted to perform the following steps:
      a2. receiving a second preset amount of the liquefied gas solvent from the second liquefied gas solvent source to be delivered to the electrochemical device;
      b2. actuating the second valve structure to allow for the flow of the second liquefied gas solvent to the electrochemical device;
      c2. determining the amount of the second liquefied gas solvent in the waste volume based on the pressure and temperature sensors;
      d2. determining the amount of the second liquefied gas solvent supplied based on the flow meter;
      e2. actuating the second valve structure to stop the flow of the second liquefied gas solvent to the electrochemical device based on the second preset amount in step (a2), the amount in step (c2) and the amount in step (d2).

25. The setup of claim 24, wherein the controller performs steps (b2)-(e2) after performing step (e).

26. The setup of claim 24, wherein the connection between the flow meter and electrochemical further comprises:
   a third valve structure; and
   a pump between the third valve structure and the flow meter;
   wherein the pump and the third valve structure are connected to the controller; and
   wherein the controller is adapted to perform the following steps:
      prior to performing steps (b2)-(e2), actuating the third valve structure to prevent the flow of gas therethrough;

actuating the pump to evacuate the waste volume of the liquefied gas solvent; and actuating the third valve structure to allow for the flow of gas therethrough.

27. The setup of claim 12, wherein the liquefied gas solvent is selected from the group consisting of : fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, molecular oxygen, molecular nitrogen, carbon monoxide, carbon dioxide, sulfur dioxide, dimethyl ether, nitrous oxide, nitrogen dioxide, nitrogen oxide, carbon disulfide, hydrogen fluoride, hydrogen chloride, combination thereof, and isomers thereof.

28. A method of forming a liquefied gas electrolyte in an electrochemical device, the method comprising:

providing a fill setup comprising:

a liquefied gas solvent source connected to a flow meter, wherein the liquefied gas solvent has a vapor pressure above an atmospheric pressure of 100 kPa at a room temperature of 293.15 K;

the flow meter connected to the electrochemical device;

a valve structure constructed to allow the liquefied gas solvent to flow from the liquefied gas solvent source to the electrochemical device;

wherein the connection between the flow meter and electrochemical device comprises:

a waste volume;

a pressure sensor constructed to detect the pressure of the waste volume; and a temperature control element constructed to maintain the temperature of the waste volume at preset temperature;

a. setting a preset amount of the liquefied gas solvent to be delivered to the electrochemical device;

b. adding salt to the electrochemical device;

c. actuating the valve structure to allow for the flow of the liquefied gas solvent to the electrochemical device, wherein the liquefied gas solvent mixes with the salt to form a liquefied gas electrolyte;

d. determining the amount of the liquefied gas solvent in the waste volume based on the pressure sensor and the present temperature;

e. determining the amount of the liquefied gas solvent supplied based on the flow meter;

f. actuating the valve structure to stop the flow of the liquefied gas solvent to the electrochemical device based on the preset amount in step (a), the amount in step (d) and the amount in step (e).

* * * * *